United States Patent [19]

Kemerer et al.

[11] 4,290,248
[45] Sep. 22, 1981

[54] CONTINUOUS PROCESS FOR FORMING PRODUCTS FROM THERMOPLASTIC POLYMERIC MATERIAL HAVING THREE-DIMENSIONAL PATTERNS AND SURFACE TEXTURES

[75] Inventors: William J. Kemerer, 122 Derwent Dr., Pittsburgh, Pa. 15237; Clyde W. Vassar, Cholchester, Vt.

[73] Assignee: William James Kemerer, Long Beach, Calif.

[21] Appl. No.: 639,328

[22] Filed: Dec. 10, 1975

Related U.S. Application Data

[63] Continuation-in-part of Ser. No. 538,645, Jan. 6, 1975, abandoned.

[51] Int. Cl.³ .............................................. E04C 1/00
[52] U.S. Cl. .................................. 52/309.16; 52/314; 52/555; 52/558; 264/46.1; 264/167; 264/171; 264/210.1
[58] Field of Search ............... 264/210 R, 171, 46.1, 264/177 R, 210, 210.1; 425/371; 52/309.7, 309.16, 314, 555, 558

[56] References Cited

U.S. PATENT DOCUMENTS

| | | | |
|---|---|---|---|
| 3,674,388 | 7/1972 | Heilmayer | 425/72 |
| 3,824,057 | 7/1974 | Kornylak | 425/371 X |
| 3,852,387 | 12/1974 | Bortnick | 264/210 R X |
| 3,895,087 | 7/1975 | Ottinger | 52/314 X |
| 3,897,667 | 8/1975 | Turck | 52/314 X |
| 3,933,964 | 1/1976 | Brooks | 264/171 |

Primary Examiner—Thomas P. Pavelko
Attorney, Agent, or Firm—William L. Krayer

[57] ABSTRACT

A continuous process and apparatus are disclosed for forming products from thermoplastic polymeric material having three-dimentional patterns and surface textures on one or both faces that may be similar or dissimilar with or without a continuously changing profile and with or without shaped edges, such as shake shingle panels, board and batten panels, rough barn board panels, wainscoting panels, brick panels, stone panels, patterned door panels, similar structural wall panels, roofing or siding panels, ribbed soffits, fascia board, flooring reinforced with egg crate ribs, forms for pouring contoured concrete structures, and other three-dimensional pattern and surface textured plastic products which may extend in widths up to 4 feet or more and in lengths up to 20 feet or more.

24 Claims, 28 Drawing Figures

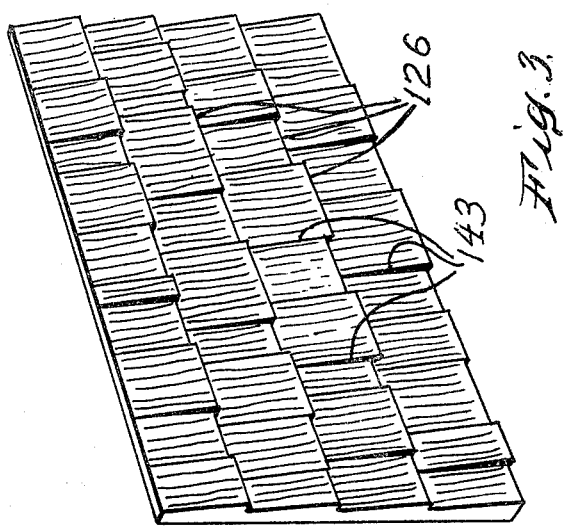
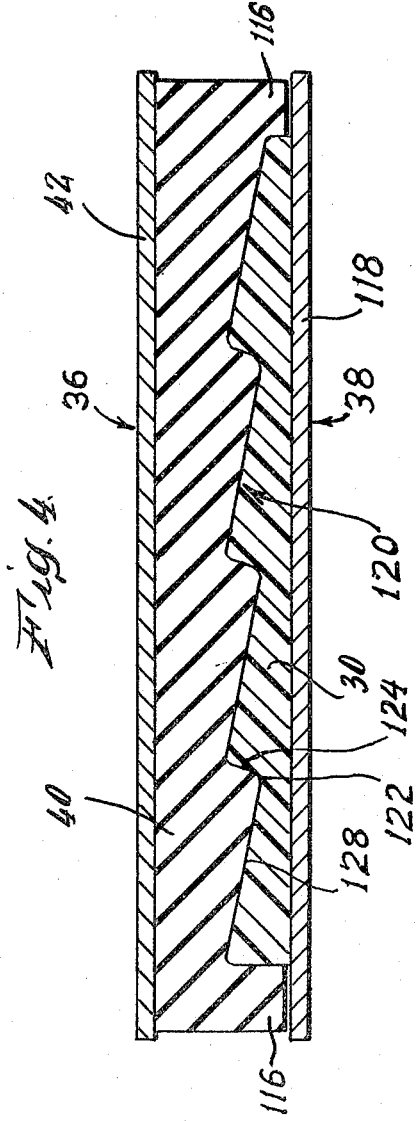
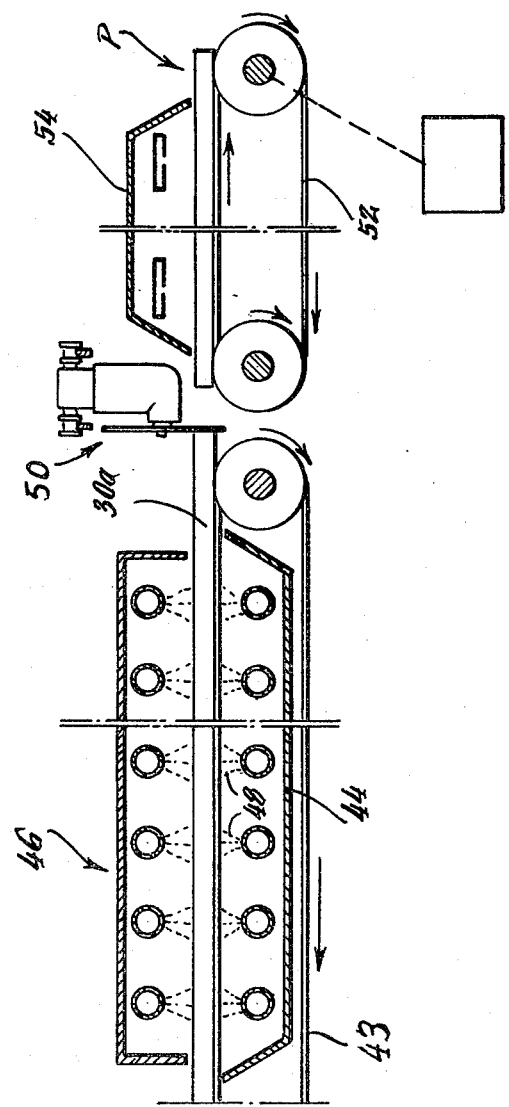

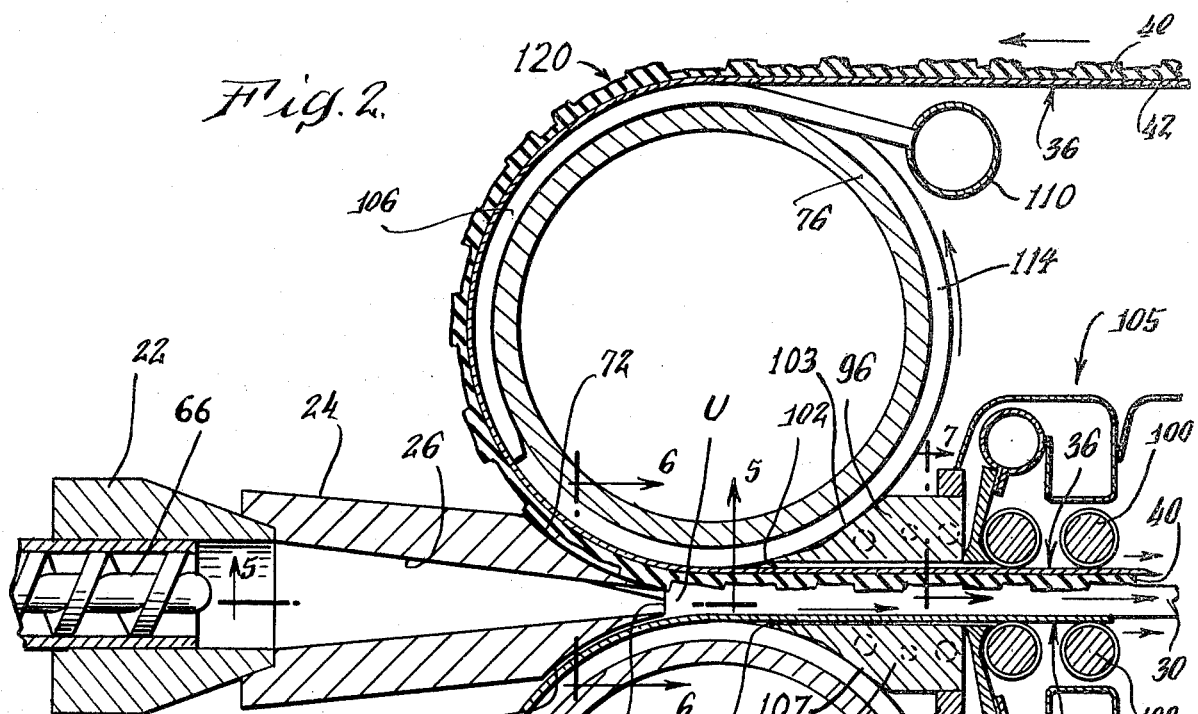
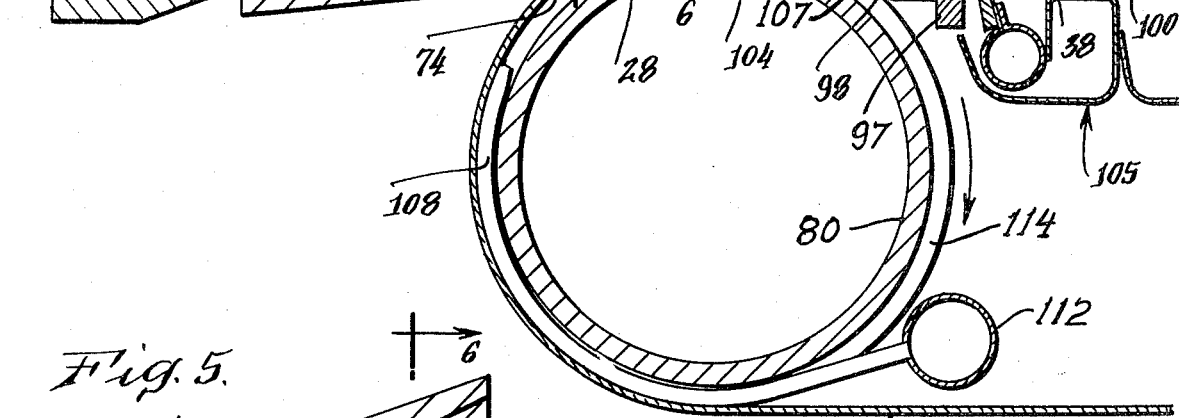
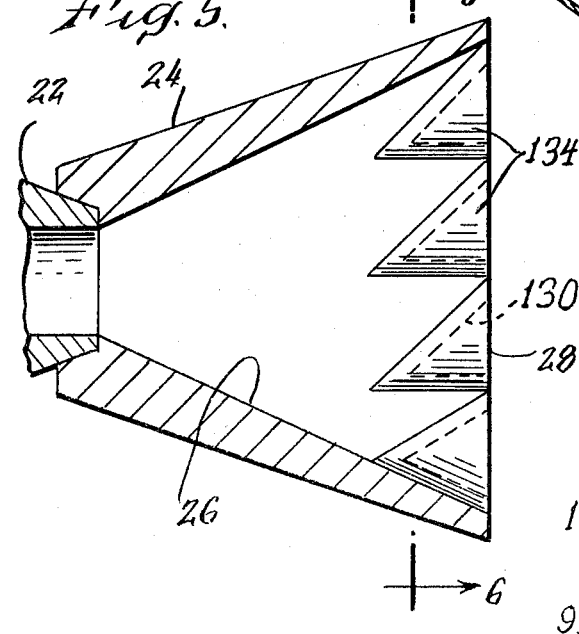
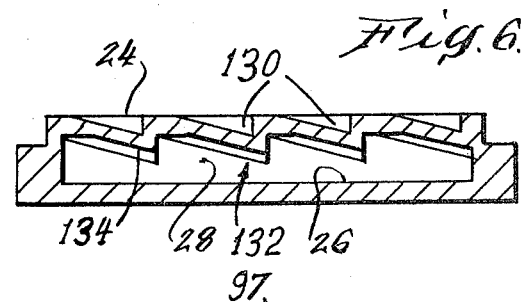
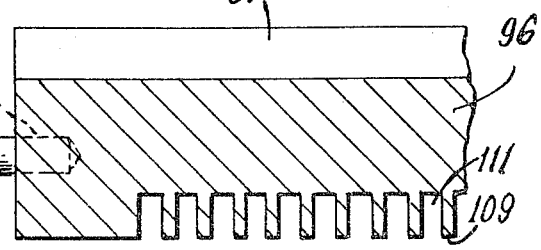
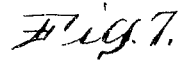

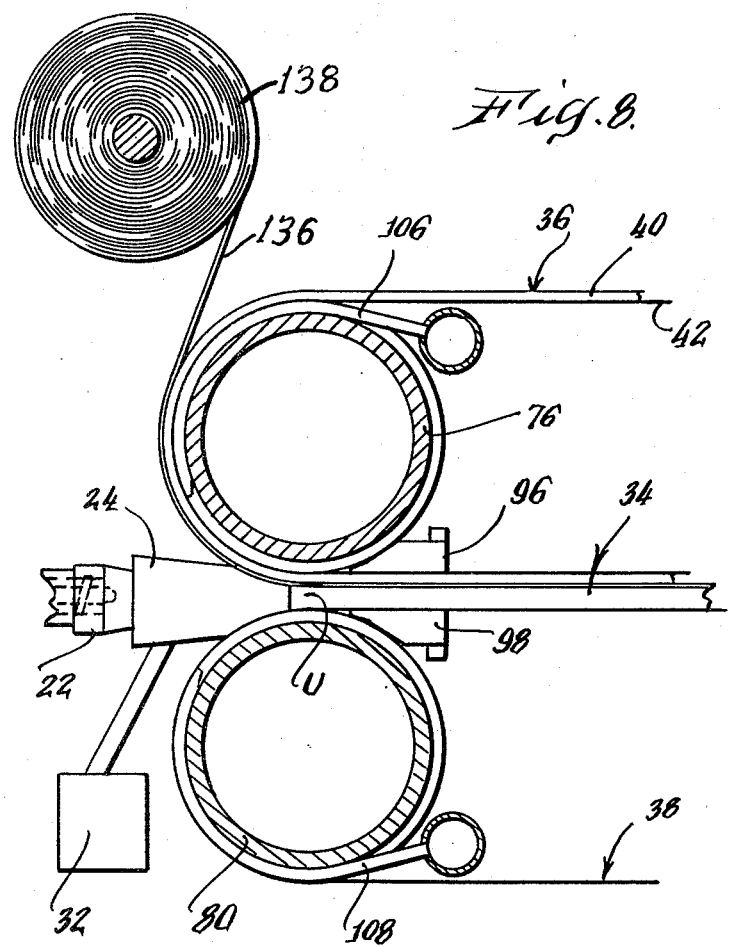
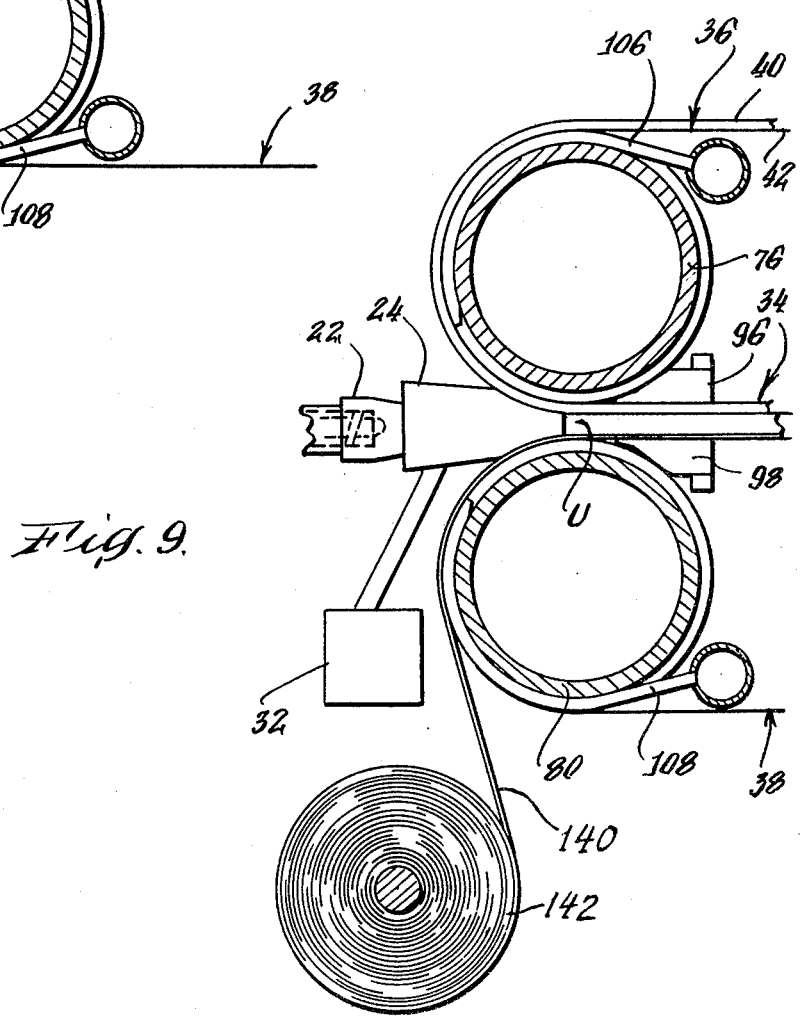

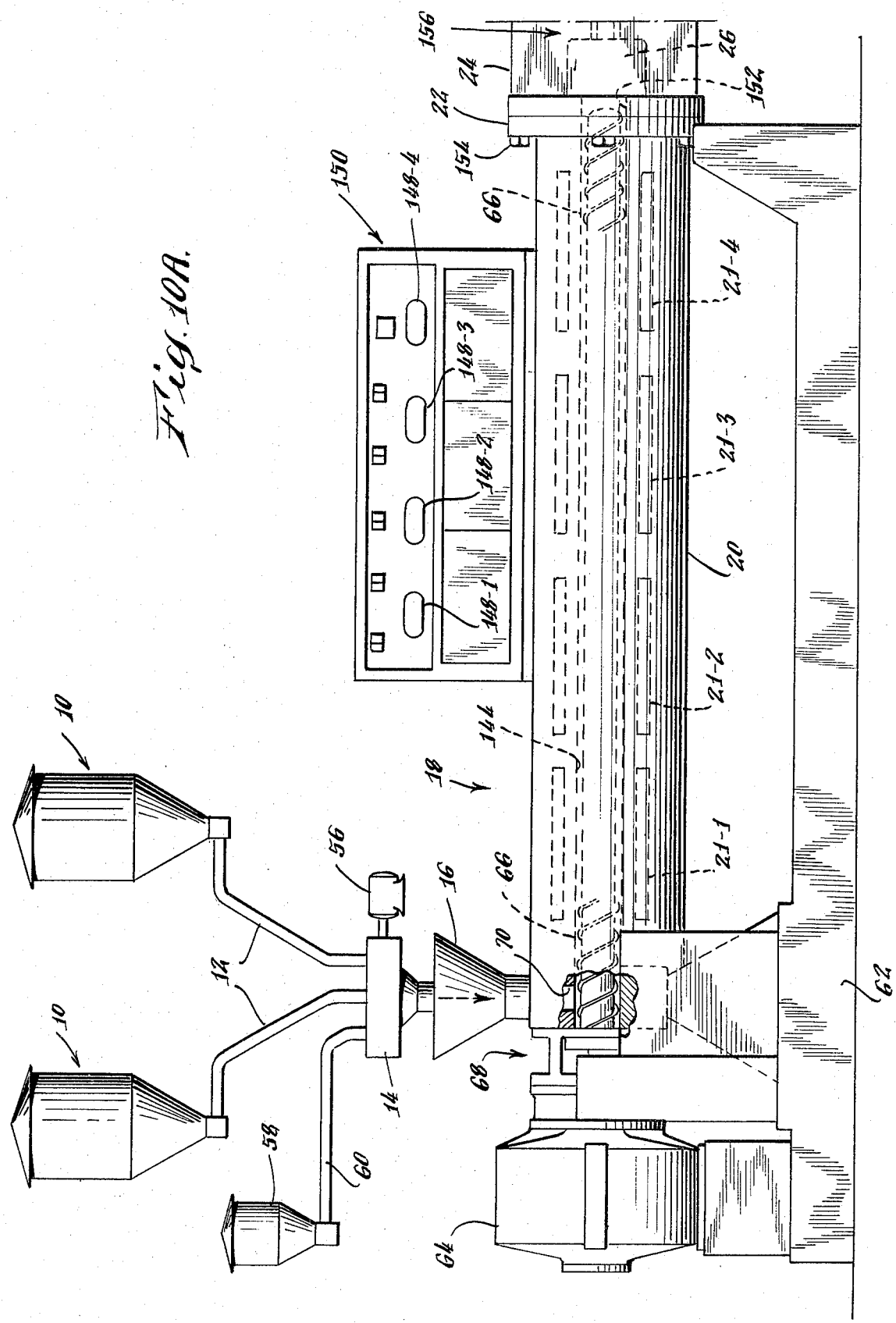

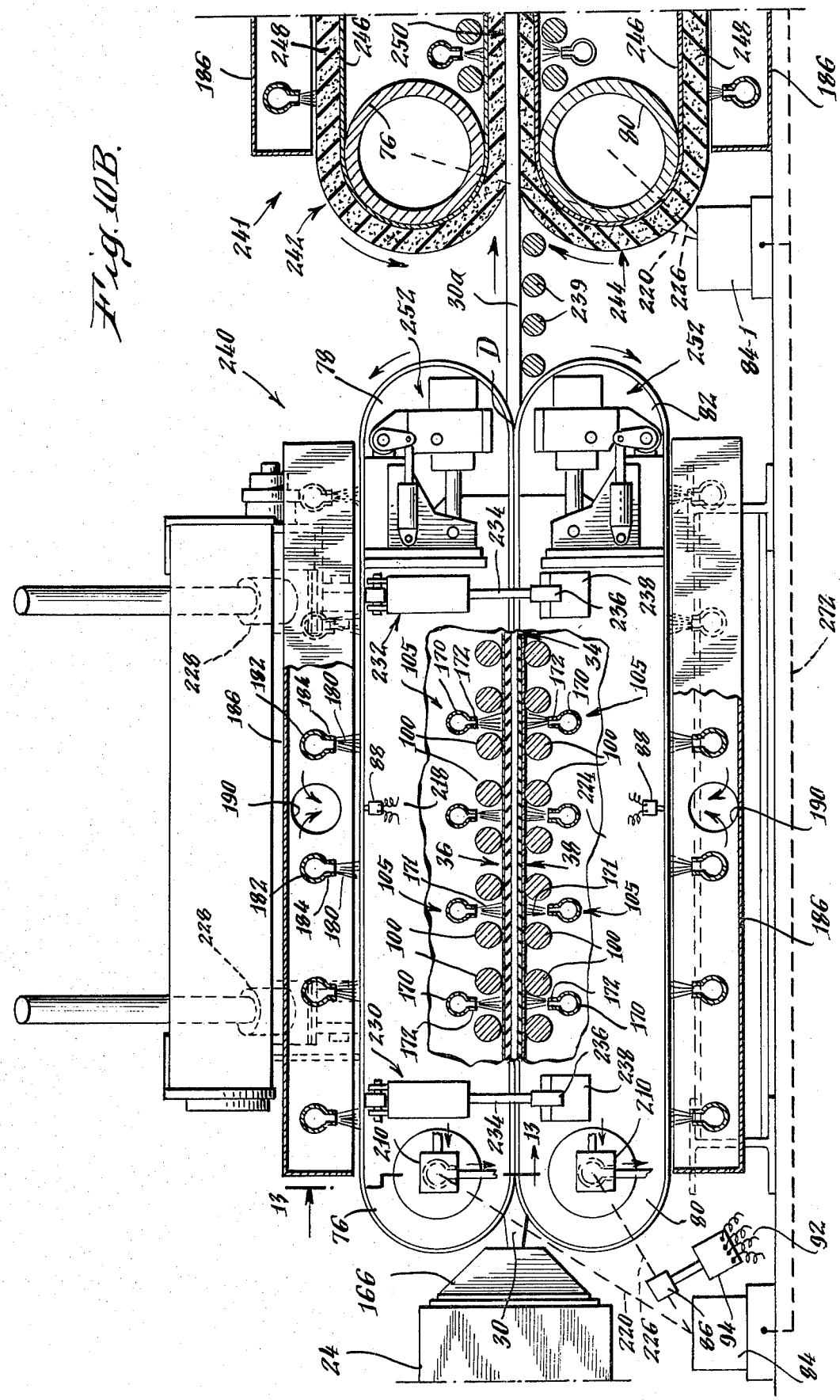

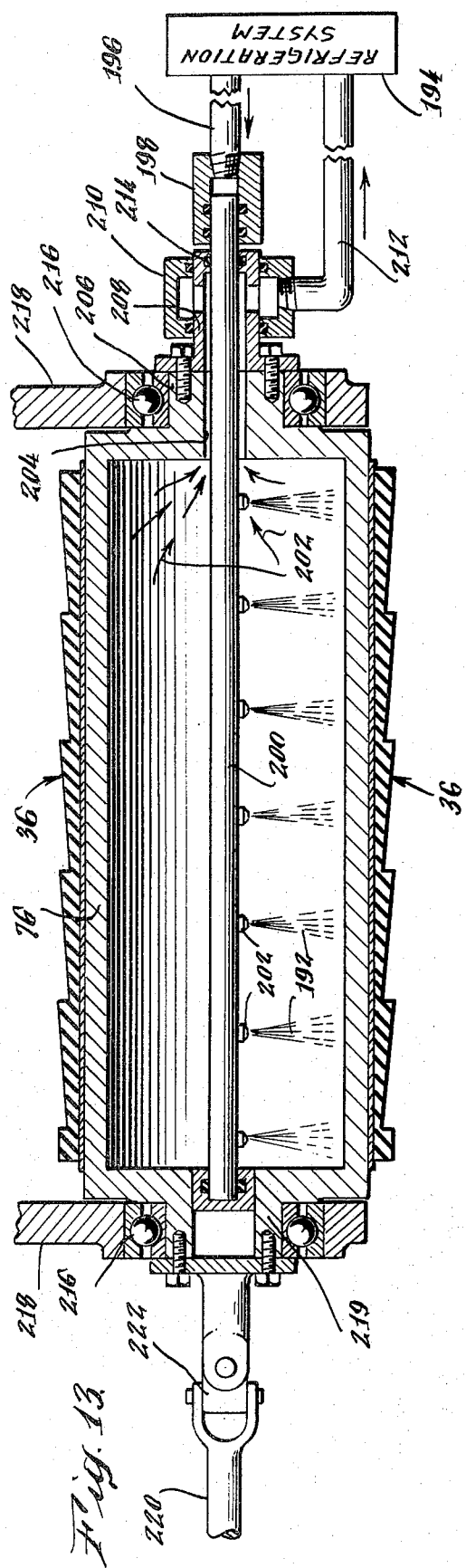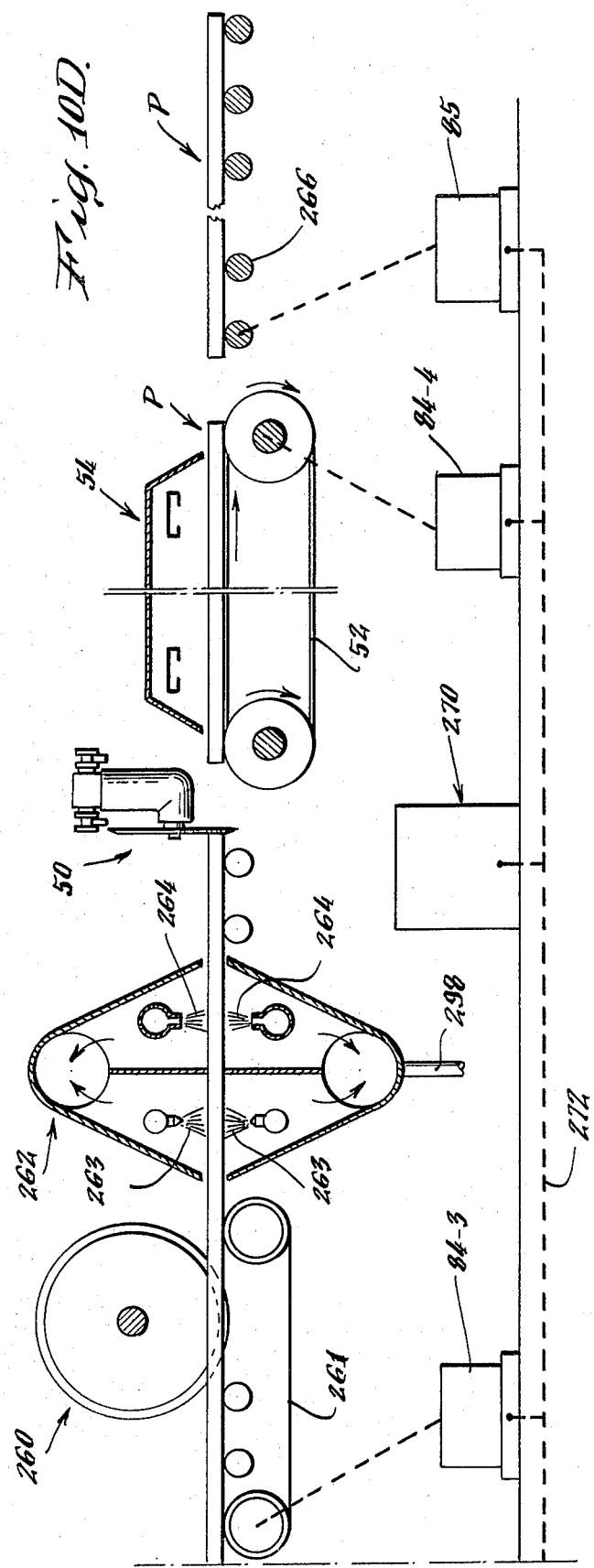

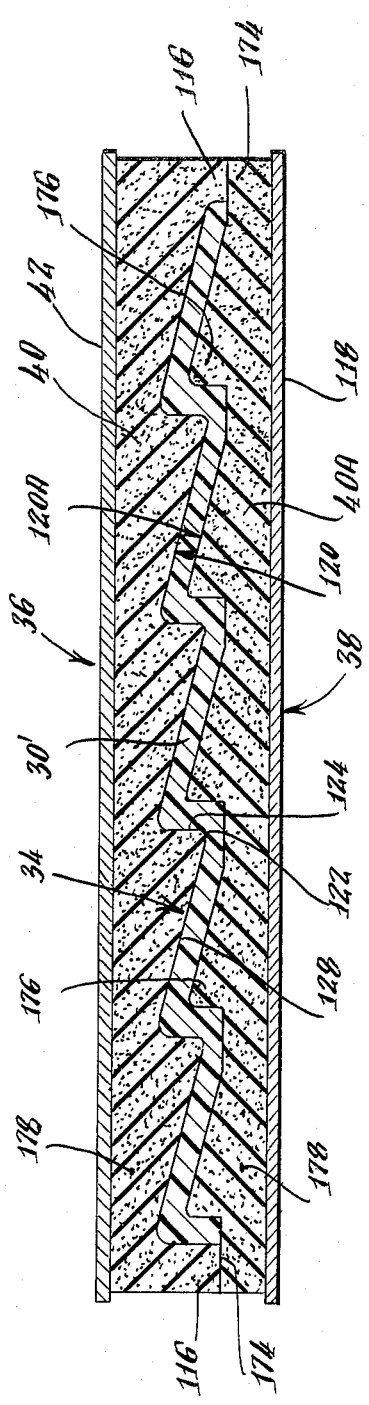
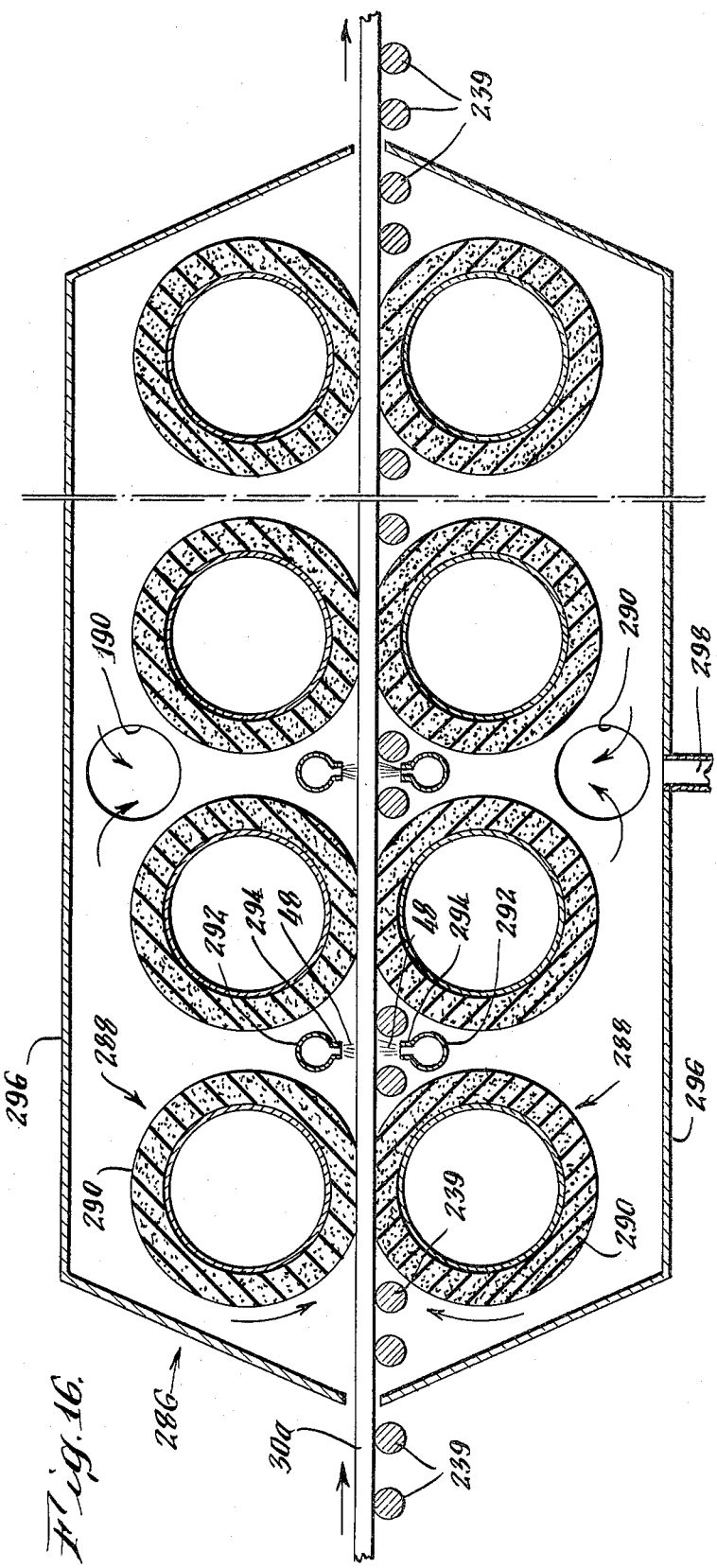

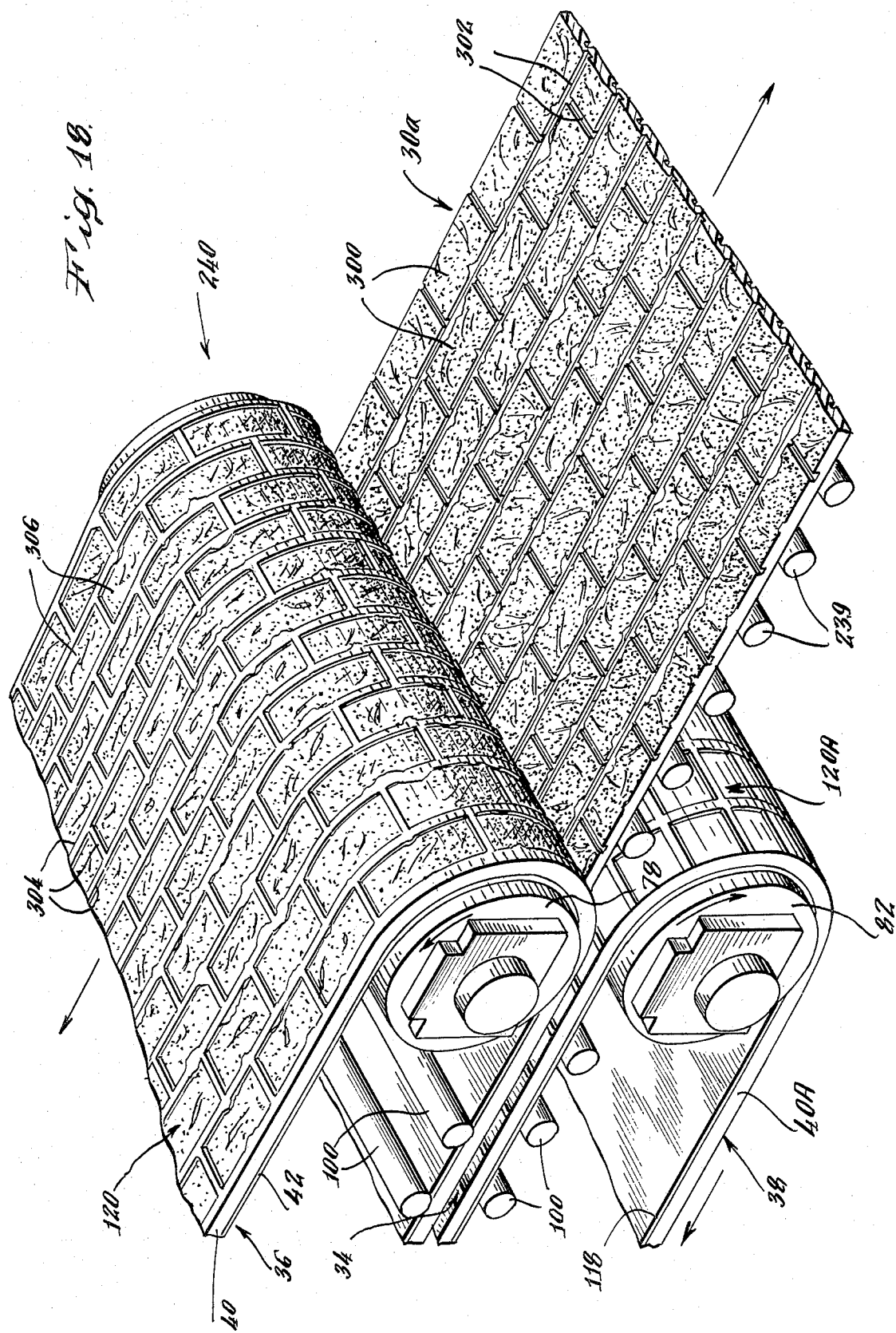

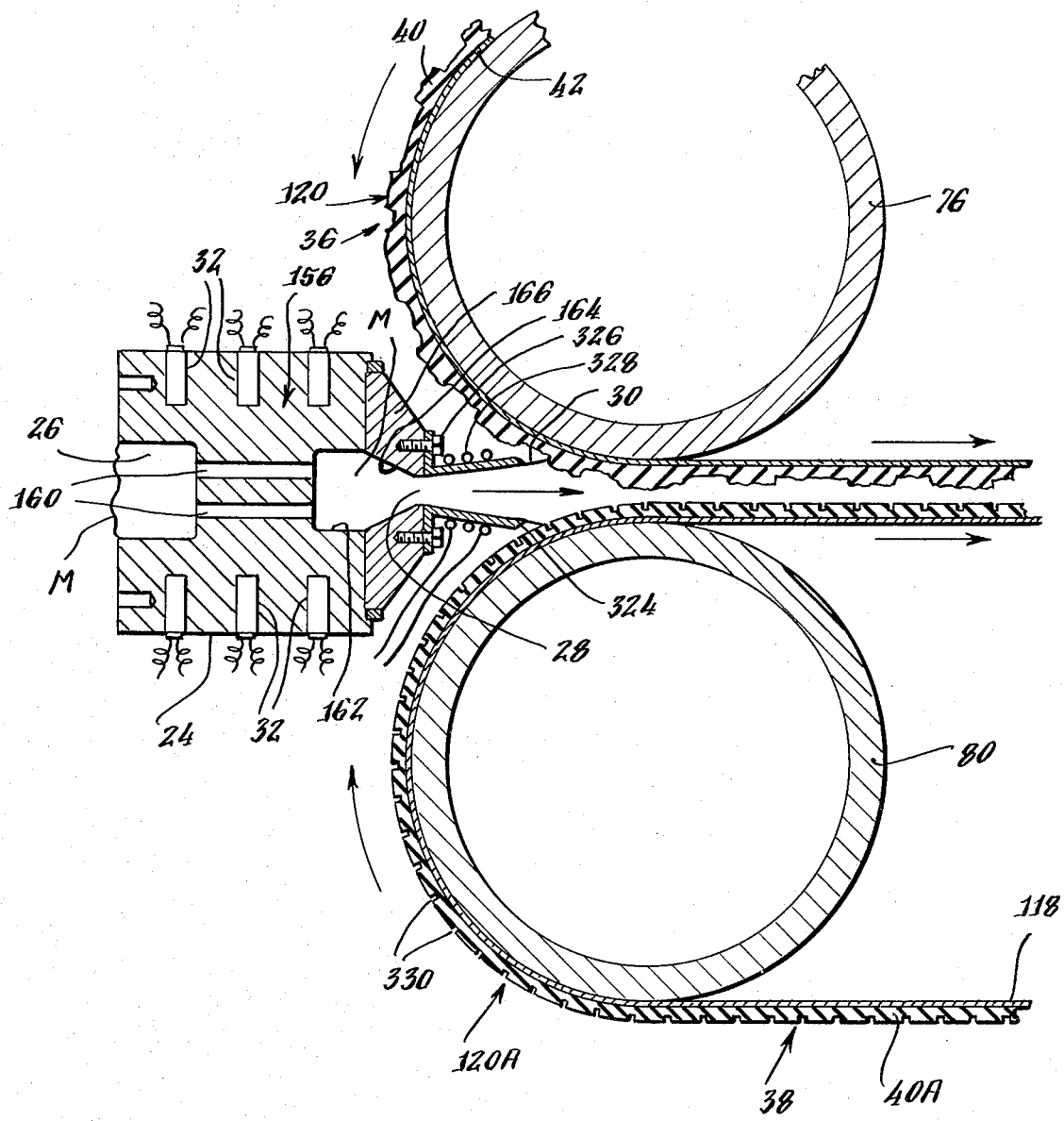

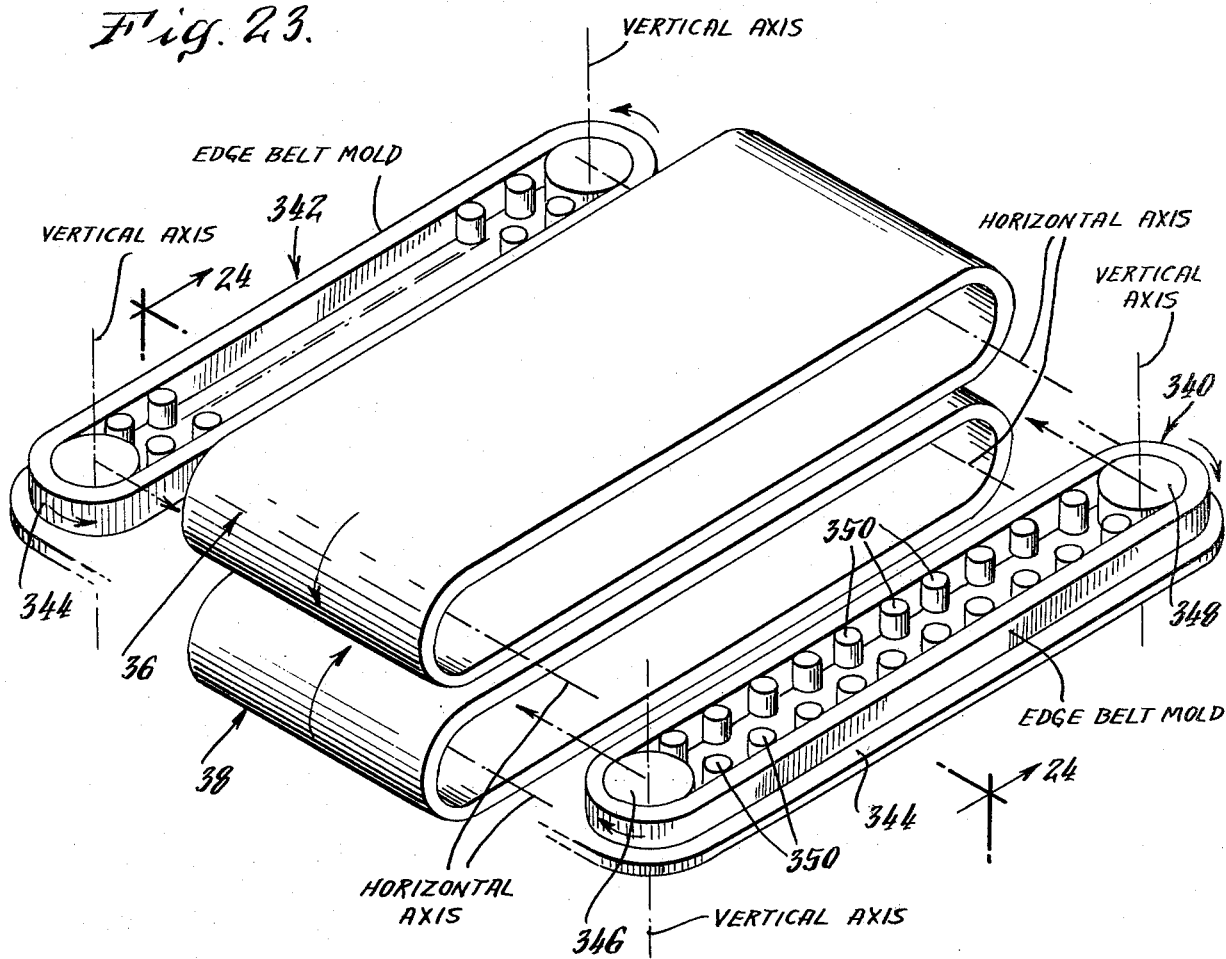
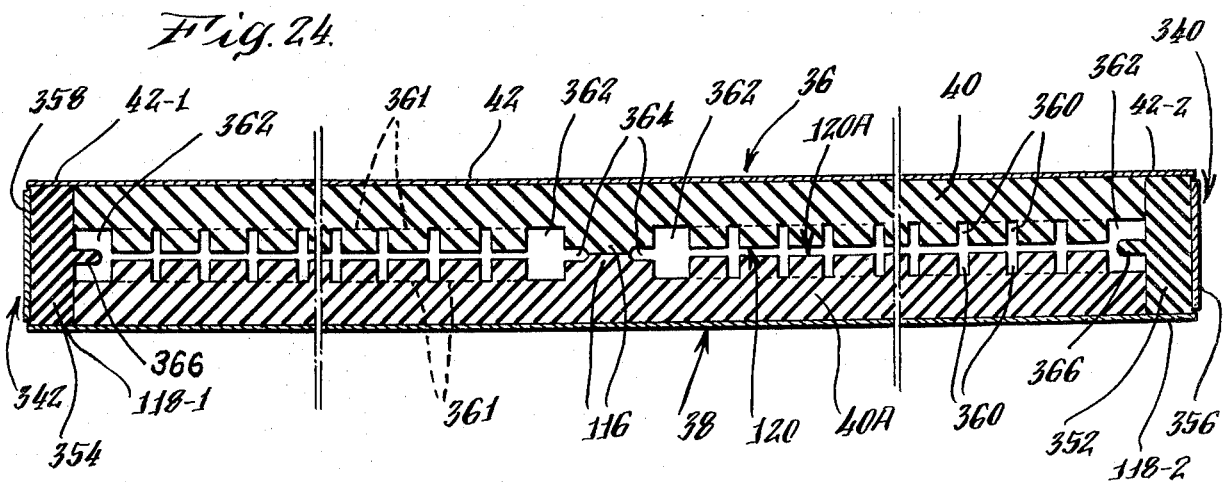

CONTINUOUS PROCESS FOR FORMING PRODUCTS FROM THERMOPLASTIC POLYMERIC MATERIAL HAVING THREE-DIMENSIONAL PATTERNS AND SURFACE TEXTURES

RELATED PATENT APPLICATION

This application is a continuation-in-part of prior copending application, Ser. No. 538,645, filed Jan. 6, 1975, now abandoned.

BACKGROUND OF THE INVENTION

Large area, i.e. two feet or more, by eight feet or more thermoplastic panel-type products are very difficult to make by conventional molding techniques. The present invention enables such large area products to be made even extending up to twenty or forty feet long, or longer, if desired, plastic panel-type products having three-dimensional patterns and surface textures on one or both faces that may be similar or dissimilar with or without a continuously changing profile and with or without shaped edges, such as shake shingle panels, rough board and batten siding panels, rough barn board siding and wall panels, wainscoting panels, brick panels, stone panels, patterned door panels, similar structural wall, roofing, siding and door panels, ribbed soffits, fascia board, flooring reinforced with egg crate ribs, forms for pouring contoured concrete structures and other products having three-dimensional patterns and surface texture. Insofar as we are aware, the prior art does not contemplate, nor suggest, the manufacture of such large three-dimensional patterned and surface textured panels and does not teach those skilled in the art how one should proceed to solve the many problems involved in making such large area products rapidly and economically, so as to be widely available to consumers, builders, and home remodelers at a competitive cost for practical, everyday utility.

The present invention provides a continuous forming process and apparatus for making such large area panel-type products and other three-dimensional pattern and surface textured products from thermoplastic material, providing a very large volume of such products per unit time. By virtue of this large productivity afforded by the present invention, the capital facility investment and tooling costs of the apparatus, as reflected in the cost of each product being produced, are advantageously minimized while achieving three-dimensional patterned and surface textured products.

The current status of the prior art relating to the processing of plastic materials into products is described in the 1974-1975 Edition of *Modern Plastics Encyclopedia*, Volume 51, No. 10-A, dated October 1974, as published by McGraw-Hill, Inc. On pages 2 and 3 of this Encyclopedia appears a complete index which includes a section relating to the processing of plastic materials into products. This Index section, entitled "Primary processing" appears as set below, in which the numbers refer to pages in this Encyclopedia.

| | |
|---|---|
| Primary processing 277 | Extrusion 352 |
| | Foam processing 366 |
| Blow molding 278 | Expandable PS molding 366 |
| Extrusion blow molding 278 | Extruded thermoplastics foam 371 |
| Injection blow molding 284 | Structural foam melt methods 379 |
| Calendering 288 | Urethane foam processing 377 |
| Casting of thermoplastics 291 | Injection molding 384 |
| Casting of acrylic 291 | Laminating of film 410 |
| Casting of nylon 298 | Mechanical forming 414 |
| Casting of PP film 298 | Blanking 414 |
| Casting of PVC film 301 | Forging and solid phase forming 416 |
| Casting of thermosets 301 | Plastisol processing 423 |
| Centrifugal molding of RP 304 | Radiation processing 419 |
| Coating 308 | Reinforced plastics/composite processing 427 |
| Extrusion coating and laminating 308 | |
| Melt roll coating 322 | Filament winding 427 |
| Powder coating 328 | Low-pressure molding 438 |
| Transfer coating 330 | Matched die molding 433 |
| Compression molding 332 | Pultrusion 444 |
| Controls and instrumentation 335 | Rotational molding 446 |
| Extrusion controls and instrumentation 335 | Testing equipment 463 |
| | Thermoforming 451 |
| Injection controls and instrumentation 338 | Tooling 470 |
| | Dies 470 |
| | Injection molds 473 |
| | Transfer molding 456 |
| | Web impregnation 460 |

This description of the prior art in *Modern Plastics Encyclopedia* is incorporated herein by reference as background to show the actual current practices throughout the plastics industry. Certain processes of the prior art are briefly described hereinafter.

Injection molding is a batch process which can be used to produce plastic products having three-dimensional shapes, but the sizes of articles which can be made and the speed of the production cycle are now severely limited by practical and economic factors. The molds must be very rigid and hence massive to resist distortion from the high pressures under which the injected plastic is caused to flow throughout the mold. Thus, heavy costly equipment is needed to move these massive molds. There is a limitation to the practical size of injection molds, because of the clamp forces necessary to hold the molds closed, which already are of the order of 1,000 to 3,000 tons for the largest conventional injection molds. The plastic material is heated up to a high temperature level within its plastic range, so that it will flow in the mold. Often, the plastic is heated to a temperature of about 600° F., which includes a substantial superheat. The hot plastic is forced into the mold under great pressure, for example 20,000 pounds per square inch. When the hot material has flowed in and throughout to fill all of the mold cavities, the massive molds, together with the hot plastic therein, must be cooled requiring that a relatively great amount of heat energy (Btu's) be removed. This cooling is accomplished by running cold water through numerous passages within the mold wall.

A lengthy time period occurs while the running water cools the mold so as to cool the plastic material, and the removal of the heat energy from the superheated plastic represents a waste of thermal energy. Finally, the mold is opened, the injection molded articles are removed, and the cycle is repeated.

In order to make injection molding economical, a number of small similar articles are often molded simultaneously during each cycle in massive molds, sometimes weighing up to thirty tons.

In addition to the lengthy time cycle and the costly, massive molding equipment often used, injection molding consumes a large amount of thermal energy which must be withdrawn and rejected in each cycle by the cooling water.

The extrusion process can be used to produce plastic articles of a continuous cross-sectional profile having no variation in the longitudinal plane. Extrusion can be a relatively high speed production technique, i.e. a high volume per unit time can be produced. Tooling costs associated with extrusion forming of plastic materials are usually far less than those for injection molding, but there is the limitation that the cross-sectional profile of the extruded product remains fixed. Sometimes extruded products are formed with very simple variations in cross section or laterally such as by corrugations, but essentially the wall thickness and cross section of the extrusion remains fixed, as determined by the shape of the extrusion nozzle orifice. For example, U.S. Pat. No. 3,751,541—Hegler shows the continuous formation of partially transversely corrugated thermoplastic tubing by extruding the tubing and passing the tubing while still in the thermoplastic state between two sets of revolving semi-circular corrugated mold half assemblies, each set of mold halves being connected together in endless fashion and applying a vacuum to the outside of the tubing between the corrugated mold halves to draw the tubing wall against the corrugated mold halves. U.S. Pat. No. 3,864,446—Maroschak is similar to Hegler except that short inserts are positioned in the semi-circular valleys of the semi-tubular mold sections for producing interrupting gaps or recesses in certain annular ribs of the corrugated pipe being molded. These tubing processes cannot produce panel-type products having three-dimensional pattern and surface textures on one or both faces that may be similar or dissimilar and which may be one inch or more thick and in which the profile can vary in thickness across the width of the product by one inch or more, because the product is formed by applying vacuum to the outside necessarily causing the inner surface of the tubing to be generally the negative image of the outer surface.

In the thermoforming process, a previously made rigid sheet of thermoplastic material of uniform thickness is placed adjacent to a forming die. While the sheet is heated, a vacuum may be created between the die and the sheet. Atmospheric pressure, or other fluid pressure source, then pushes the sheet against the die into conformance with the die shape. The thermoforming process produces a three-dimensional pattern on one face of the article, but the back surface of the article is generally a negative image of the front face with somewhat rounded contours. The thickness of the plastic sheet material used for thermoforming is usually limited to less than one-quarter of an inch because of the need for this sheet material to become accurately conformed to the die face by the fluid pressure being exerted. Panel-type products having dissimilar three-dimensional patterns and surface textures on both surfaces cannot be thermoformed nor can the thicknesses and thickness variations, as discussed, be obtained. Thermoforming is in essence not a truly continuous process, and the length of the finished product is limited to the length of the initial sheet.

Thermosetting materials can be formed by compression molding by placing the material between dies where it is subjected to heat and pressure. But the size of the articles to be made is limited by the magnitude of the forces involved in the compression operation, and the production rate is limited by the time required for the thermoset to take effect throughout the product. The concept and procedural steps involved in such compressive thermosetting molding are quite different from the continuous extrusion and casting steps of the present invention providing the numerous advantages summarized below.

Various types of articles are produced by introducing expandable plastic granules into a mold cavity where they become coherent and are formed by the expansion pressure of the materials, for example articles made of foamed polystyrene. This type of molding is generally called foam processing. Continuous foam processing is shown in Yovanovich—U.S. Pat. No. 3,736,081 wherein granules of thermoplastic material containing a heat expanding agent are continuously fed into a travelling mold channel defined by attachments on a chain belt and then they are heated by steam introduced under pressure into the mold channel. In Hall—U.S. Pat. No. 3,888,608—prefoamed polymer particles are fed into a channel defined between endless belts composed of transverse strips of alternatively gas-permeable and gas-impermeable material and are heated by steam passing through the perforated belts causing further foaming to take place for fusing the particles together. Such foam processing in which the shaping of the product depends upon the internal foaming pressure of the expanding material is quite different from the continuous ribbon feeding and shaping steps of the present invention in which the final shaping of the product is produced by mechanically rolling continuous travelling flexible cooled molds against opposite surfaces of the thermoplastic material.

In U.S. Pat. Nos. 3,764,642 and 3,879,505, of Boutillier are described methods of making extruded profiled sections of expanded thermoplastic material having an integral thick skin. The profile of the extrudate is constant along the length of the product, because the extrudate is pulled through a stationary cooled shaper of constant cross section by a drawing caterpillar. Forming is obtained by foaming expansion pressure against the stationary walls of the shaper and not by mechanically impressing continuous travelling molds against opposite surfaces of material. These methods of the patentee cannot make panel-type products having three-dimensional patterns and surface textures on one or both surfaces, nor those products in which the surface profiles change along the length of the product.

In Di Benedetto, et al.—U.S. Pat. No. 3,841,390 multiple metal pieces are cast in a plurality of mold cavities by flowing molten metal downwardly through a pouring chute into a runner channel located between the upper edges of a pair of closed loop belts made of flexible material, such as vulcanized rubber. These rubber belts revolve in the horizontal plane around a plurality of pressure plates carried on the outer surface of a revolving sprocket chain. A line of individual metal castings is formed in which the individual articles are connected to a runner casting by sprue portions from which they are broken away. The impressions are formed by gravity flow of molten metal down into a pre-existing cavity already defined by the rubber belts which previously had been pressed together in face-to-face contact. This molten metal casting action is quite different from initially impressing revolving cooling molds onto opposite sides of a ribbon of heated thermoplastic material by progressive localized rolling pinching action to change the thermoplastic ribbon into the specific profile shapes and textured patterns desired and then holding the traveling molds against the impressed material to retain the impression while the material is cooled into its memory retention state.

The reader may be interested in Gartaganis, et al.—U.S. Pat. No. 3,712,843, wherein corrugated board is made by applying heat to the newly assembled corrugated board by the planar surface of an endless moving steel belt. In this laminating of corrugated board, the steel belt is heated, not cooled. In Smith—U.S. Pat. No. 3,726,951 walled structures are made of foam-in-place plastic material deposited by a progressively moving foaming head having multiple driven planar belts forming a channel into which the foaming plastic material is passed as the head progresses about the structure. See also U.S. Pat. No. 3,837,774—Ross, et al. in which elongated rigid molded products, such as strip molding for trimming door and window frames, are continuously produced from curable resin by mixing and pouring a curable liquid or foam-type synthetic material from nozzles onto a lower revolving mold belt just before it mates with an upper revolving mold belt to define a closed moving cavity of constant cross section. The mold belts are shown being heated to cure the foam material to form the product having an inner core of lesser density and a skin of greater density. In U.S. Pat. No. 3,837,781—Lambertus multiple side-by-side strands of synthetic plastic material are extruded and delivered into the V-shaped grooves of a multi-groove cooled conveyor band. Each strand lies in one lengthwise groove of the band and is carried along by the frictional adhesion and a roller presses the strands into the grooves to prevent detachment of the strands from the groove. In none of these four patents (Gartaganis, et al., Smith, Ross, et al. nor Lambertus) is there a ribbon of heated thermoplastic material against whose opposite sides two cooled revolving flexible belt molds are rolled under pressure by opposed nip rolls to impress three-dimensional patterns and textured surfaces thereon, the travelling belt molds being thereafter held under pressure against opposite sides of the impressed thermoplastic material to cause it to retain its shape while being cooled by the belt molds into its memory retention state.

The reader may be interested in the application of flexible steel belts to the casting of molten metal in smooth strips, billets or slabs, as described in Hazelett U.S. Pat. Nos. 2,904,860; 3,036,348; 3,041,686; 3,123,874; 3,142,873; 3,167,830; 3,228,072; 3,310,849; 3,828,841; 3,848,658 and 3,878,883.

SUMMARY OF THE INVENTION

The present invention enables large area panel-type products, measuring two or more feet by six or more feet, even extending up to twenty or forty feet long, or longer, if desired, and having three-dimensional patterns and surface textures on one or both sides, with or without a continuously changing profile and with or without shaped edges to be economically produced, rapidly and practicably, so as to be widely available to consumers, builders and home remodelers at a competitive cost for practical, every day utility. Examples of such products are shake shingle panels, rough board and batten siding panels, rough barn board siding and wall panels, wainscoting panels, brick panels, stone panels, patterned door panels, and similar structural and decorative wall, roofing, door or siding panels, ribbed soffits, fascia board, flooring reinforced with egg crate ribs, forms for pouring contoured concreated concrete structures, stockade cedar fencing sections, and other three-dimensional and surface textured plastic products, wherein their attractiveness arises from duralibility and low cost maintenance plus weight savings and also in large measure from the play of highlights and shadows on their three-dimensional patterned and textured surfaces giving an overall pleasant textural effect, in addition new configurations of products may be formed such as underfloor layments, moisture barriers, insulation and sound deadening panels, and the like.

Other three-dimensional pattern and surface textured products can be made from thermoplastic polymeric material by the process and apparatus of the present invention. A large productivity is provided by employing this process and apparatus, and thus the fixed costs as reflected in the large volume of product output per unit time are minimized.

A ribbon of the thermoplastic polymeric material heated to be in a plastic state and preferably at no more than 220° F. above the glass transition temperature is furnished by an extruder, mixer or feeding device. The temperature level of the material above the glass transition temperature is sufficient to enable three-dimensional pattern and surface textural forming of the thermoplastic material to take place as it initially enters between the travelling cooling molds where a progressive localized rolling pinching action initially occurs. But this temperature level is at a relatively small differential above the glass transition temperature, preferably no more than 220° F. above, thereby advantageously requiring that only a relatively small amount of Btu's be removed by the travelling cooling molds per unit of production. The polymeric material may be distributed laterally through flow equalization means to the approximate thickness of the profile of the product to be produced. The heated thermoplastic material is then fed to form a wide ribbon of this material having a thickness of at least one quarter of an inch in certain regions and which may be one inch or more thick. This ribbon may contain multiple layers or strata of differing composition and density or may be reinforced or laminated with plys that will reinforce, decorate or protect the product. The plys which may be included are continuous strips of expanded metal, glass fabric, another plastic, or the like, and the surface plys for decorative or protective effect may be colored film, paper, metal foil, asbestos fiber, or the like.

This wide heated ribbon is then passed into a travelling mold channel defined between opposed revolving cooling molds which have the three-dimensional pattern forms and surface textures desired to be impressed on this ribbon. One or both of the revolving cooling molds may have this three-dimensional pattern and textured surfaces which may be repetitive or random over a length of twenty feet or more. Moreover, the travelling molds may have a width of 48 inches or more. The travelling molds are continuously initially pressed by a progressive localized rolling pinching action against the heated ribbon while the ribbon is still maintained at the temperature level above its glass transition temperature for impressing three-dimensional patterns with profile variations and textured surfaces on one or both of its faces. As the impressed thermoplastic material is carried along between the cooling molds, which travel along the same speed and may be precisely synchronized in their travel, pressure is continuously exerted to maintain the three-dimensional pattern clearly defined in the thermoplastic material, and the travelling molds are cooled for cooling the impressed material to a temperature below its glass transition temperature and into its memory retention state for permanently retaining the impressed pattern. This shape-retaining impressed cooled material is carried away from the downstream end of the travelling mold path and may be delivered into apparatus where it is further cooled gradually until it is of similar temperature throughout its thickness for preventing warpage of the product. Containment-muff-cooling is shown for holding the product in a plane while gradually cooling it throughout. Further treatment, such as painting, coloring, shaping, trimming, or cutting, may be carried out on the cooled plastic for finishing the final products.

Where the three-dimensional pattern to be made in the panel contains abrupt longitudinally extending contours, as seen in transverse section, plus distinctive transversely extending contours (such as in a shake shingle panel), the heated thermoplastic material may be extruded through an orifice having a profile corresponding approximately with the average transverse sectional profile of the product to be cast (such as occurs in overlapping tapering shake shingles). The profile is aligned with the corresponding average transverse sectional profile of the casting channel. Thus, the ribbon being furnished may be preliminarily formed in transverse profile by the orifice, and then the travelling mold further impresses the ribbon for refining or deepening the transverse sectional profile and for impressing the distinctive transversely extending contours (such as to depict each individual shingle with its rough-hewn texture and slightly staggered or offset butt location vis-a-vis the neighboring shingles). Such preliminary forming reduces the amount of displacement of the plastic material to be done by the three-dimensional pattern forms of the cooling molds. This preliminary forming is more advantageous where solid (i.e. non-foaming) thermoplastic material is being shaped with a transverse section having abrupt changes in profile and may be omitted where less dense more readily displaceable heated thermoplastic materials are being shaped, for example such as those containing foaming agents.

SUMMARY OF ADVANTAGES OF EMPLOYING THE INVENTION

Among the many advantages provided by process and apparatus embodying the present invention are those arising from the fact that large area panel products, such as attractive architectural panels, and other three-dimensionally patterned products may be produced in a large volume output from thermoplastic material, which from certain aspects achieves the relatively high production capacity and moderate production facility and tooling costs of continuous extrusion, while at the same time from other aspects there is simultaneously achieved the high resolution three-dimensional effects and intricate surface texturing and detail previously attainable in limited lengths from very high cost slow cycle injection molding of articles, thereby providing new panel products and other products at competitive costs for practical, every day utility in the building field and other fields. These surface textures may be replicas of wood grain, split wood, weatherbeaten wood, rough brick, stone panels, fabric, and the like, including an egg crate or ribbed grid configuration for structural strength and dead air space insulation on one or both sides.

Both surfaces of a continuously extruded ribbon or series of ribbons of heated thermoplastic polymeric material can be impressed and cast with three-dimensional patterns and surface textural detail which is intricate.

Insofar as we are aware, the present invention provides the only process and apparatus which can achieve all of the following:

1. A ribbon of two or more layers of dissimilar polymeric material or layers of such material laminated with plys of materials that reinforce, decorate or protect the finished product can be shaped with three-dimensional patterns and surface textures.
2. The surface textures can be of fine detail or intricacy such as in replicas of wood grain, split wood, weatherbeaten wood, bricks, stone, fabric, pebbles, gravel and the like.
3. Continuous production rates up to 15 feet per minute or more.
4. Panel-type product widths up to 48 inches, 72 inches or more.
5. Product lengths up to 8 feet, 20 feet, 40 feet or more.
6. Product thicknesses from ⅛ of an inch to over 1 inch.
7. Thickness variations in profile of 1 inch or more.
8. Random profile sections that may not be repeated in 20 feet or more.
9. Random longitudinal surface configurations that may not be repeated in 20 feet or more.
10. Edges of the products may or may not be shaped and textured.
11. Random textured or smooth surfaces and or edges that need not be repeated in 20 feet or more.
12. Surface configurations on one side that need not be a function of the surface configuration or the smooth surface of the other side.
13. Thermoplastic polymeric material supplemented with fillers and/or containing foaming agents and/or with surface plys or embedded plys of expanded metal, glass fibers, mica, or stranded material can be processed.
14. Solid thermoplastic polymeric material (i.e. without foamant) can be processed.
15. Molds can be quickly fabricated with no machining.
16. Molds may be cast from patterns made of any solid material, such as wood, plaster, rigid plastic, metal, brick, concrete, etc.
17. Molds can conveniently be fabricated in short time period by curing the pattern forms of the flexible belt molds at room temperature.
18. The final flexible belt molds can be made directly from the pattern without the need to made intervening negative, then positive, transfers as used in the present techniques for casting metal molds.
19. Compared to the high cost of an injection mold or other conventional technique for getting a three-dimensional pattern in a thermoplastic material, the relatively low cost of the flexible belt molds described open up new economically feasible opportunities for producing lower production volume customized and specifically styled products, such as on a job shop basis.
20. Convenience in changing from one mold form to another without much "down time". Each flexible belt mold can be changed in twenty minutes to one-half of an hour; whereas, the changing of an injection mold involves disconnection and reconnection of water cooling lines, hydraulic lines, electrical and timer connections, use of a large crane facility and can consume four hours to twenty-four hours in "down time".

21. No other process or apparatus can turn out these large amounts of these large area products having three-dimensional surface patterns and textured surfaces as can be done in practising the invention using a single installation with only one or two operators.

The various aspects, objects and advantages of the present invention may be more fully understood from a consideration of the accompanying drawings, in conjunction with the following detailed description. In these drawings, corresponding reference numerals indicate corresponding steps and elements throughout the various Figures.

BRIEF DESCRIPTION OF THE DRAWINGS

FIGS. 1A and 1B show a longitudinal, elevational view of apparatus embodying this invention and for performing the process of this invention, with portions of the apparatus diagrammatically illustrated and portions being shown in section;

FIG. 2 is a sectional view, shown on enlarged scale, a portion of FIG. 1A, illustrating certain process steps and details of the apparatus more clearly;

FIG. 3 is a perspective view of a large area plastic panel product having a three-dimensional architectural pattern on one face, a shake shingle pattern being shown as an illustrative example of the novel product which can be produced by the process and apparatus of this invention;

FIG. 4 is an enlarged cross-sectional view taken through the travelling cooling molds along the plane 4—4 in FIG. 1A;

FIG. 5 is a plan sectional view of the distributor means taken along the plane 5—5 in FIG. 2, as seen looking upward in FIG. 2;

FIG. 6 is a cross-sectional view of this distributor means taken through the plane 6—6 in FIGS. 2 and 5 looking downstream toward the orifice of this distributor means and showing a profiled configuration of this orifice which may be employed for molding three-dimensional patterns containing abrupt longitudinally extending profile contours;

FIG. 7 is an enlarged cross-sectional view taken through the plane 7—7 in FIG. 2 showing one of a pair of pressure shoes with coolant flow channels therein;

FIG. 8 shows apparatus similar to that seen in FIG. 1A, except that a pre-formed continuous layer or ply of flexible surfacing material is being unwound from a roll and led into the region between the revolving upper mold belt and the distributor;

FIG. 9 is similar to FIG. 8 except that a preformed continuous layer or ply of flexible surfacing material is led into the region between the revolving lower mold belt and the distributor;

FIGS. 10A, 10B, 10C and 10D show a longitudinal elevational view of modified apparatus embodying this invention and for performing the process of this invention, with portions of the apparatus being shown in section. These FIGS. are to be read in showing a production line with the drawings being arranged consecutively from left to right;

FIG. 13 is a transverse sectional view taken along the line 13—13, in FIG. 10B, showing apparatus which may be employed for cooling the mold nip rolls;

FIG. 16 is a longitudinal elevational sectional view of modified containment-muff-cooling apparatus which may be used in lieu of the cooling apparatus shown in FIG. 10C;

FIG. 17 is a transverse section taken along the line 17—17 in FIG. 11 through the travelling flexible impression and casting molds and shown on enlarged scale;

FIG. 18 is a perspective view of a large area product having a laid-up masony pattern which is being produced by the process and apparatus of this invention;

FIG. 22 is an elevational sectional view similar to FIG. 11 but showing a funnel extension positioned around a nozzle die orifice which may be used with low density foamed extrudate;

FIG. 23 is a perspective view illustrating the use of flexible side belt molds for shaping the edges of the products; and FIG. 24 is a cross-sectional view taken along the plane 24—24 in FIG. 23 showing the configurations of the two main flexible belt molds and of the two side belt molds in cooperative association therewith.

DETAILED DESCRIPTION

Figure 1A:
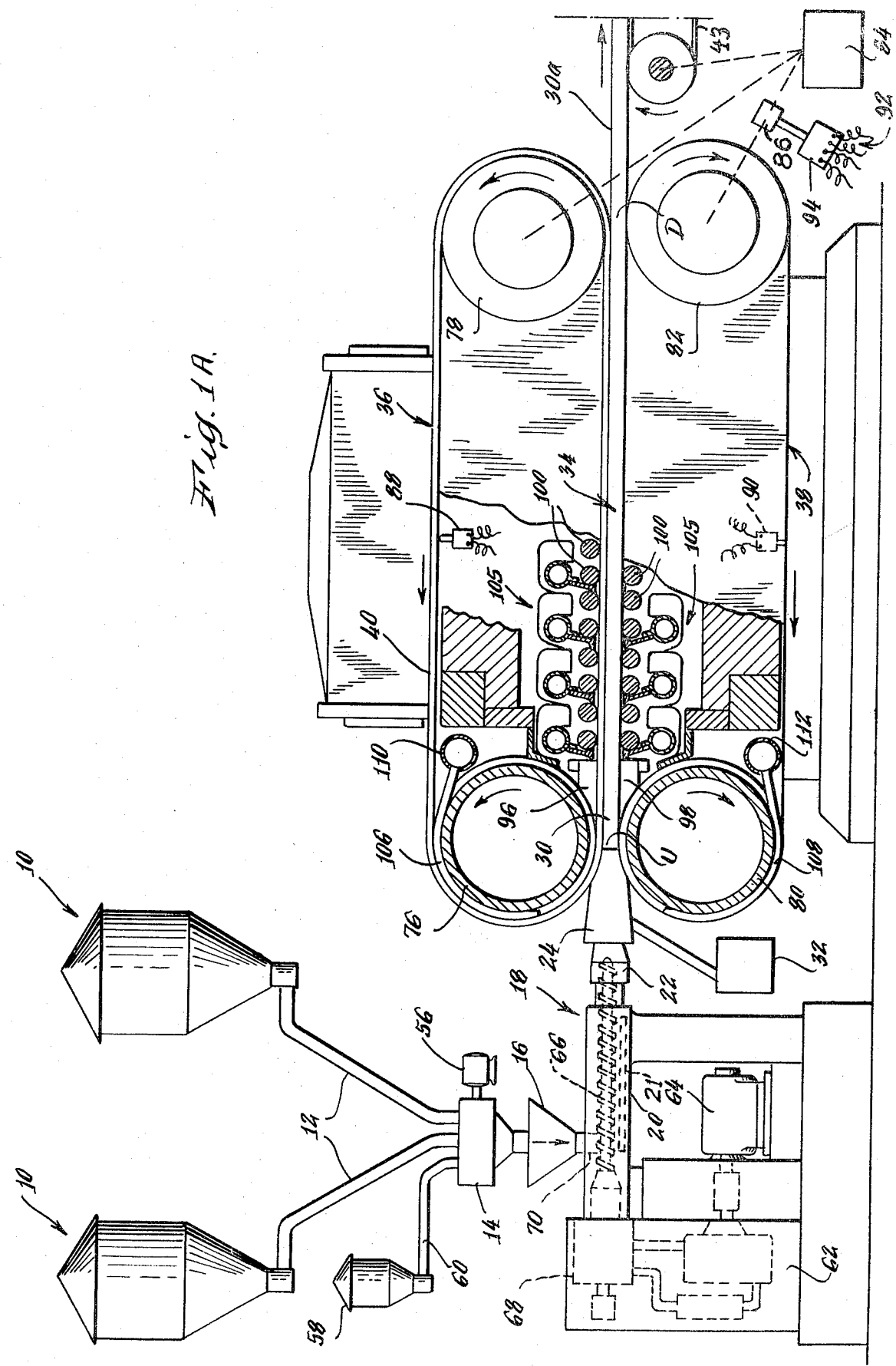

Before inviting attention to the drawings, it may be helpful to define certain terms which are used in the specification.

As used herein, the terms "in the plastic state" or "in a plastic state" is intended to mean that the synthetic thermoplastic polymeric material is at such an elevated temperature as to be unable to retain a free-standing shape or an impression.

The terms "memory retention range" or "in the memory retention state" are used synonymously to mean a low range of temperature in which the synthetic thermoplastic polymeric material will retain an impression except for normal shrinkage at normal room temperature.

The temperature over which a transition occurs between the plastic state and the memory retention state is the glass transition temperature. The glass transition temperature of a polymer is defined by Lee and Knight, *The Glass Transition Temperature of Polymers, Royal Aircraft Establishment, Farnborough, Hants, England,* (Tg) and is a characteristic of the amorphous phase. At this temperature, a transition occurs in the temperature (and pressure) derivatives of the energy, heat content, entropy, and volume, but these quantities are themselves continuous functions of temperature. Thus, on heating through the glass transition temperature, there is an abrupt increase in the coefficient of expansion, compressibility and specific heat, but no significant absorption of latent heat. The transition is not sharp but it occurs in a fairly narrow temperature range which is usually no more than one or two degrees, and the "glass transition temperature" is taken as the mean temperature in the narrow range over which this abrupt change takes place. For further information about the changes in a polymer which occur in the glass transition temperature, reference may be made to that article.

As shown in FIG. 1A, the synthetic thermoplastic polymeric material in relatively finely divided form, for example as granules, pellets, and the like, is temporarily stored in one or more containers 10, shown diagrammatically on reduced scale as silos. This granule material is processed through a sequence of steps to be outlined and then later to be described in detail. It is continuously conveyed by feed means 12 into a blender 14 in which suitable additives may be mixed with the granules and then enters a feed hopper 16 leading into a heating zone 18.

In this heating zone 18, the synthetic thermoplastic polymeric material is preferably heated up by applied heat and/or mechanical working to a moderate temperature level above its glass transition temperature. The objective is to furnish the thermoplastic material in a plastic state at the lowest practicable temperature above its glass transition temperature but preferably no more than 220° F. above said temperature, i.e. to a moderate temperature level between its glass transition temperature and 220° F. thereabove. The material is extruded under pressure by extruder means 20 which is of conventional construction except that the barrel is sufficiently long and/or temperature control means 21 are included to provide this moderate temperature level, which is below extrusion temperatures ordinarily used with the thermoplastic material involved.

For example, in the case of polystyrene, the glass transition temperature is approximately 180° F., and 220° F. thereabove is 400° F. To minimize the amount of Btu's needed to be removed during the impression molding and cooling, this material is preferably heated to a moderate temperature level above 180° F. but not above 400° F; whereas, approximately 450° F. is the extrusion temperature ordinarily used with such polystyrene material. We have produced panels 36 inches wide and up to 60 feet long varying in thickness from ⅛ inch to ⅝ inch having a brick pattern with mortar joints on one face and a variety of grid patterns on the other by extruding a ribbon of the polystyrene material at a temperature of only 323° F.

A higher temperature could be used in this process and apparatus, but the result would be to waste energy and slow production, and therefore a moderate temperature level with a differential of no more than 220° F. above the glass transition temperature is preferred. This moderate temperature level is sufficient to keep the thermoplastic material in a plastic state sufficiently long for three-dimensional patterns and surface textures to be impressed therein, as will be explained. The extruder 20 includes a discharge head 22 feeding into distributor means 24. Within the distributor means 24 is a distribution chamber 26 (FIG. 2) for spreading the material laterally substantially uniformly. This distribution chamber terminates in a die orifice 28 (FIGS. 2, 5 and 6) which is relatively wide and narrow for forming the heated thermoplastic material into a wide continuous heated ribbon 30 at least one quarter of an inch thick. Temperature control means 32, for example electrical resistance heating means, may be associated with the distributor 24 for maintaining the temperature of the thermoplastic material in the lateral distribution channel 26 at the moderate level as described above.

A long molding and cooling channel 34 is provided between the opposed runs of a pair of revolving endless flexible mold belts 36 and 38 intended to impress a three-dimensional pattern and textured surface onto the heated material 30 and to conduct heat way from the heated material 30 being continuously passed along through the channel 34 while exerting continuing pressure upon the impressed material as it is cooled. At least one of these mold belts 36 and 38 carries a three-dimensional flexible pattern form 40 on its front face in a postion for the pattern form to impress the heated material 30 in the channel 34.

The molding and cooling channel 34 extends from an upstream location U adjacent to the exit from the orifice 28 to a downstream location D at the discharge from between the mold belts 36 and 38.

As the continuous ribbon 30 of heated thermoplastic material is extruded under pressure from the orifice 28 into the upstream end U of the channel 34, the opposed mold belts are initially pressed, as shown in FIG. 2, against opposite sides of the heated material by a progressive localized rolling squeezing action for impressing a three-dimensional pattern on at least one of its surfaces.

By virtue of the fact that this impression molding is initially occurring in a narrow localized band extending across the width of the upstream channel end U, a relatively high pressure per unit area is effectively exerted on the ribbon 30 in the region U, while the pressure exerted over the remainder of the channel 34 may be much reduced. The initial localized pressure exerted by the mold belts serves to impress the desired three-dimensional architectural pattern and surface texture onto the ribbon of the heated material and the continuing pressure exerted by the mold belts 36 and 38 along the channel 34 is sufficient to retain the desired pattern clearly impressed into the travelling material 30 as it is being cooled.

As shown in FIG. 4, the three-dimensional pattern form 40 of the mold belt 36 is provided by a flexible heat resistant material, such as rubber, secured as by adherent bonding to a thin, wide flexible steel belt layer 42 which acts as a support for the rubber mold form 40, and also serves as a heat conducting element engaged by the high velocity coolant liquid being applied to the mold belt 36. This flexible mold form 40 can be molded from room temperature vulcanizing silicone rubber, for example General Electric RTV 664 silicone rubber obtainable commercially from The General Electric Company, bonded to a steel belt having a thickness in the range from approximately 0.025 of an inch up to approximately 0.075 of an inch. A silicone rubber mold form 40 of medium hardness, i.e. having a durometer reading in the range from 25 to 100 will work well. A firm rubber mold surface having a hardness in the upper portion of this range may be used where fine surface textural detail and sharp resolution are desired in the product; whereas, a softer rubber mold surface having a hardness in the lower portion of this range may be used where less surface detail but undercuts are desired in the product. If desired, the rubber mold form 40 can have a softer layer adjacent to the steel belt layer with a harder mold patterned surface. The pattern used can be conveniently made up of an assembly of hand-hewn wood shake shingles against whose surfaces the silicone rubber mold form 40 is molded.

A silicone rubber belt mold reinforced with a web of metal or non-metal may be used, the web may be woven or non-woven.

In the apparatus shown, the total circumferential length of the mold belt 36 may, for example be slightly more than twenty-four feet, and the architectural pattern thereon may repeat itself three times, each pattern being eight feet long. There may be a small spacing between each repetition of the pattern to allow for a flying cut-off operation to cut the final panel products P to length. If desired, the same pattern may repeat itself three times, or two or three different patterns may be utilized, depending upon the desired product mix to be produced.

It is to be understood that this belt length is given by way of example. The three-dimensional pattern of the rubber mold 40 may be a continuous pattern, for example such as a board and pattern or a rough barn board pattern, which is adapted to be cut anywhere. In such a case, a belt length somewhat differing from twenty-four feet is advantageous because the cutting of such a pattern in eight foot increments will provide attractive variations in the apparent wood grain and knot patterns in respective panel products. It is also to be understood that other pattern lengths and pattern repetition arrangements may be used, for example, a plurality of products of different lengths may be produced by each revolution of the mold belts. If desired, large area panel products extending up to twenty or forty feet long or longer can advantageously be produced. For example, roofing, wall or flooring panels, four feet wide and sufficiently long to cover the full length or half the length of a house roof or the full length of the wall or floor of a large room in a house, can be made.

Instead of using a cut-off station, as shown, the rubber mold form 40 may include transversely extending divider ridges which serve to separate the successive products. These transverse divider ridges may be staggered along their lengths, so that the resultant products interlock, for example as desirable in a brick pattern panel in which the bricks in various courses are offset or staggered.

In order to cool the moving stretches of the mold belts 36 and 38 for cooling the impressed material 30 to a temperature below its glass transition temperature and into its memory retention state, liquid coolant is applied in this embodiment of the invention at high velocity onto the reverse surfaces of the mold belts 36 and 38 by coolant application means to be described later.

As the cooled three-dimensionally impressed product material 30a in its memory retention state is continuously discharged from the downstream end D of the cooling mold channel, conveyor means 43 receive this product material. The conveyor 43 may transport this material 30a through a supplemental cooling station 46 in which coolant fluid 48, for example water sprays, directed against both surfaces of the moving web 30a provides further cooling and the fluid coolant is caught in a receiver 44. The conveyor 43 may be porous, perforated or formed of linked elements for exposing the lower surface of the product material 30a to the cooling fluid 48. The material 30a may then be led to a flying cut-off station 50 for forming the individual products P, unless they were already separated by divider ridges in the mold form 40.

In cases where the temperature of the impressed material 30a is sufficiently low, the conveyor 43 may bypass the supplemental cooling station 46 and carry the material 30a directly to the cut-off station 50 for cutting the panel products P to length. Another conveyor 52 leads the panels P away from the cutter 50 and may pass them through a finishing treatment station 54, for example to apply a surface treatment such as painting to the panels P.

Considering the process and apparatus of FIGS. 1A and 1B in greater detail, it is noted that the feed means 12 are shown as air conveyors extending from the storage containers 10 to the blender 14. In the blender, there are revolving blades (not shown) driven by a motor 56 for mixing the synthetic thermoplastic polymer particles with additive material supplied from a container 58 through a conveyor duct 60 leading into the blender 14. The additive constituents may include coloring agents, ultra-violet effect inhibitors, foaming agents, talc powder, mica, and the like.

The heating zone 18 is shown as being defined within the barrel of the extruder 20, which is mounted on a base 62. An electric motor 64 serves to drive the feed screw 66, for example by means of a hydraulic drive mechanism 68. In the heating zone 18, the granules of the synthetic thermoplastic material become heated by the work imparted through the feed screw 66. This feed screw is sufficiently long to prevent undue heating of the material being extruded by preventing undue slippage shearing heating effects in the stream of material as it is fed forward by the screw feed action. The granules pass down as indicated by the arrow through the feed hopper 16, and through a feed box 70 leading into the feed screw 66.

The temperature of the heated thermoplastic material in the heating zone is accurately controlled by temperature control means 21 which may comprise electrical resistance heating elements and also water cooling passages associated with the feed box 70 and feed screw 66. As stated above, the thermoplastic polymeric material within this zone 18 is preferably maintained at a temperature level within a differential of 220° F. above the glass transition temperature thereof to minimize the amount of Btu's to be removed later. The process and apparatus embodying this invention are not limited for use with any particular thermoplastic material. Thermoplastic polymeric materials which are suitable for use in processing into panel products P and other products by the process and apparatus of this invention include polystyrene, polyvinyl chloride, polyethylene and other polymers and copolymers of ethylene, acrylonitrilebutadiene-styrene copolymers, polyurethane, polypropylene, polycarbonates, polyamides, polyimides, polysulfones, polyaromatic oxides, etc.

As shown in FIGS. 2 and 5, the distribution channel 26 narrows down in one dimension (in this example the vertical dimension) while progressively widening laterally in the other dimension (horizontally). Accordingly, the discharge orifice 28 becomes sufficiently narrow and wide to distribute the heated material uniformly as it is extruded therethrough to fill the channel 34.

The opposite exterior surfaces 72 and 74 (FIG. 2) of the distributor 24 which are adjacent to the revolving mold belts 36 and 38 are shown as having a concave cylindrical saddle configuration for minimizing the distance from the exit of the die orifice 28 into the upstream end U of the channel 34.

In order to support and guide the wide endless flexible mold belts 36 and 38, these belts are revolved around pairs of main rolls 76, 78 and 80, 82, respectively. The main rolls 76 and 80 adjacent to the upstream region U may be referred to as the nip rolls, while the two main rolls 78 and 82 near the downstream region D are called the downstream rolls. A drive mechanism 84 is coupled to both of the downstream rolls 78 and 82 for revolving both of the mold belts 36 and 38 at the same speed.

In the apparatus illustratively shown in FIGS. 1A, 2 and 4, the lower belt mold 38 has a smooth surface facing the casting channel 34. Thus, there is no need to take steps to precisely synchronize the movement of the two belt molds 36 and 38. It is to be understood that in all cases the two belt molds travel at nominally the same speed.

When the lower belt 38 is removed and replaced with one carrying a three-dimensional pattern form, provided by a rubber mold form bonded to a steel belt such as described above, then it may be desirable to assure that the two belts continue to revolve in synchronism, so that their three-dimensional patterns remain in registry one with another. For this purpose, a differential transmission 86 (FIG. 1A) is placed in the drive shaft coupling between the main drive mechanism 84 and the lower downstream roll 82. Optical sensors 88 and 90 serve to sense indexing marks which are placed along the margins of the belts 36 and 38 on their inside surfaces. These sensors 88 and 90 are connected by leads 92 to control means 94 for operating the differential drive 86 which acts as a vernier adjustment to keep the lower belt 38 in registration with the travel of the upper belt 36.

For supporting the mold belts 36 and 38 between the pairs of main rolls, there is shown an opposed pair of shoes 96 and 98 and a plurality of back-up rollers 100 which are of much smaller diameter than the main rolls. The shoes 96 and 98 are positioned closely adjacent to the nip rolls 76 and 80, and the front faces of these shoes may be concavely tapered as shown at 103 and 107 providing saddle shaped surfaces, so that they can fit closely beneath the nip rolls. To enable the mold belts to slide smoothly over these shoes, their leading edges are rounded as shown at 102 and 104 in FIG. 2.

As explained further above, there is a progressive localized rolling squeezing action in the upstream region U near the orifice 28 where the nip rollers 76 and 80 are revolving and pressing the two belt molds 36 and 38 toward each other. Thus a high pressure per unit area occurs in this region U to impress the mold form 40 into the ribbon of heated thermoplastic material 30. The flexible belt molds 36 and 38 are rolled and impressed by the opposed nip rolls 76 and 80 against opposite surfaces of the ribbon of thermoplastic material, but after the initial forceful impression is made against these opposite thermoplastic surfaces, they are not allowed to flow away or change from their impressed shape because they are thereafter being retained and held under continuing pressure between the travelling belt molds 36 and 38. The shoes 78 and 80 are stiffened by transverse braces 97 and are rigidly secured in position by multiple fastening means 99 engaging in sockets 101 (FIG. 7) in the ends of these shoes. Thus, these guide shoes 96 and 98 exert pressure against the back surfaces of the belt molds and supplement the action of the nip rolls in retaining the three-dimensional impression in the heated thermoplastic material 30 as it commences to be cooled by the cold belt molds 36 and 38. It is to be noted that these shoes 96 and 98 may be removed and replaced by one or more back-up rollers, as shown in FIGS. 10B and 11 for holding the belt molds 36 and 38 against opposite sides of the impressed thermoplastic ribbon.

Coolant is applied in this embodiment at high velocity to the reverse surfaces of the respective belts by means of coolant applicators 105 which may be similar to those shown in U.S. Pat. No. 3,041,684—R. W. Hazelett, et al.

The nip rolls 76 and 80 and the back-up rollers 100 may have circumferential fins for enabling the coolant to be applied to the reverse surfaces of the belts. Also, the shoes 96 and 98 have longitudinally extending lands 109 (FIG. 7) defining grooves 111 enabling the liquid coolant to pass along the belt surface. The liquid coolant may be initially applied to the belts through curved coolant feed tubes 106 and 108 supplied by header ducts 110 and 112. These coolant feed tubes nest within the grooves 114 between the fins on the nip rolls 76 and 78.

The wide revolving belt molds 36 and 38 may be tensioned and steered by means of apparatus, such as shown in U.S. Pat. Nos. 3,123,874; 3,310,849; and 3,878,883—R. W. Hazelett, et al.

As shown in FIG. 4, the rubber mold form 40 has a pair of shoulders 116 projecting over closely adjacent to the other belt mold 38, which is shown as comprising a single layer 118 of steel. The rubber mold form 40 has a three-dimensional shake shingle patterned surface 120 extending between the projecting shoulders 116 for producing the panel product P shown in FIG. 3. This patterned surface 120 includes longitudinally extending ridges 122 with abruptly sloping faces 124 for molding the line of the butt ends 126 (FIG. 3) of the respective shingles in the panel P. These ridges 122 also have gradually sloping surfaces 128 for molding the outer surfaces of these shingles. The sloping mold surfaces 128 are striated, i.e. have a surface texture for making the product appear almost identical with the rough textured surfaces of hand-split shake shingles and are of locally varying heights and varying slope for clearly impressing the outline and texture of each individual shingle. The abruptly sloping surfaces 124 are slightly staggered for molding the shingle butts 126 of somewhat different lengths as characteristic of an installation of shake shingles.

In order to accommodate the ridges 122 of the patterned mold surfaces, corresponding clearance recesses 130 (FIG. 6) may be formed in the exterior saddle surface portions 72 (FIG. 2) of the distributor 24.

In view of the fact that the product P (FIG. 3) contains abrupt longitudinally extending profile contours, as provided by the line of the butt ends 126, the impression of this butt line 126 in the thermoplastic material may be aided by providing a profiled configuration 132 (FIG. 6) for the nozzle orifice. This nozzle profile 132 is generally aligned with the corresponding average cross-sectional profile of the product pattern to be impressed. Thus, the ribbon of material 30 being extruded through the orifice 28 is preliminarily formed, and then the travelling molds 36 and 38 further impress and complete the desired three-dimensional patterns in the products. As shown in FIGS. 5 and 6, the nozzle profile may be provided by a plurality of tapering triangular fillets 134 in the upper or lower, or both, wide converging surfaces of the distribution passage 26.

As shown in FIG. 8, a pre-formed layer or ply 136 of flexible surfacing material, such as a decorative or weather-resistant film, may be introduced to be molded into the patterned surfaces of the products to be formed. This surfacing ply 136 is payed out from a supply roll 138 and is introduced into the upstream channel region U by leading it between the upper revolving belt mold 36 and the nearby saddle surface 72 (FIG. 2) on the outside of the distributor die 24.

Similarly, as shown in FIG. 9, a pre-formed layer or ply 140 of flexible surfacing material, for example such as a reinforcing backing sheet or insulative layer may be applied onto the back surfaces of the products to be formed. This backing ply is fed from a supply roll 142 and is led between the lower revolving belt mold 38 and the adjacent saddle surface 74 (FIG. 2) on the outside of the distributor die 24.

With reference to FIG. 5, it is noted that a single extruder discharge head 22 is feeding into the diverging distributor chamber 26. In order to increase production capacity, a plurality of the extruders 20 (FIG. 1A) can be used simultaneously by arranging for each of their discharge heads 22 to feed into this lateral distribution chamber 26 (FIG. 5). For example, a pair of identical extruders 20 can be positioned with their discharge heads 22 each aimed at an angle of approximately 45° toward the center line of the distributor 24 and with the two discharger heads simultaneously feeding into the upstream end of the distributor 24 near the center line thereof. Thus, these two extruders are simultaneously feeding into the chamber 26 for increasing the production capacity of the overall apparatus.

If it is desired to form products having layers of plastic material of differing characteristics, multiple extruders 20 can be arranged to feed one above the other into the distributor 24 (FIG. 2). Partitions are then provided within the chamber 26 for guiding the respective flows of heated plastic material into the respective layers to be formed. For example, two extruders can be used, one feeding into the chamber 26 above a horizontal partition therein, and the other feeding into the lower portion of this chamber 26 below this partition, in effect defining a pair of elongated extruder die orifices one above the other. Thus, products having two layers of different characteristics can be conveniently formed.

When it is desired to introduce a web of reinforcing material, for example a web of expanded metal or a glass fiber fabric, a pair of parallel horizontal partitions are provided within the chamber 26 for defining a pair of extruder die orifices above and below the web. The web of reinforcing material is fed longitudinally between these extruder orifices. A pair of extruders feed heated thermoplastic material into the distributor chamber 26 respectively above and below the area where the reinforcing web is being introduced. Thus, the reinforcing web advantageously becomes embedded in the products being formed.

The terms "thermoplastic polymeric material" or "thermoplastic material" or "such material", as used herein, are to be considered synonymous and are intended to include such material consisting solely of thermoplastic polymeric material as well as such material containing one or more thermoplastic polymeric materials, together with other constituents, such as fillers, talc powder, mica, foaming (i.e. blowing) agents, coloring agents, ultraviolet effect inhibitors, extenders, reinforcements, etc. It is among the advantages of the process of the invention that its operation is not sensitive to the percentage of blowing agent used or not used in the thermoplastic material. When a blowing agent is used, for example such as sodium bicarbonate mixed with citric acid, its purpose is to establish a desired density in the end product and the amount of blowing agent does not have much effect upon the process. There is a decrease in heat transferability due to the production of cellular structure in the thermoplastic material, but also there is a decrease in the amount of mass from which heat energy is to be removed; so that these effects of increasing the amount of blowing agent tend to balance each other in the process, thereby leaving the linear production rate unaffected. An unduly large amount of blowing agent is readily determinable since it will produce an uneven cellular structure with unduly large voids.

In order to increase the production capacity, it is to be understood that means for pre-cooling the heated ribbon 30 may be included between the extruder orifice 28 and the upstream end U of the mold channel 34.

Inviting attention to FIG. 3, it is to be noted that the three-dimensional pattern on the panel P includes distinctive variations 143 in contour extending transversely with respect to the longitudinally extending abrupt variations in profile 126. Moreover, these transverse pattern variations and fluting 143 are more or less randomly positioned so as to provide a truly attractive product.

In the treatment station 54 (FIG. 1B) various other operations may be performed such as trimming, routing, shaping, forming tongues and grooves, decorating, painting, surfacing, drilling, punching, deflashing etc.

In the remaining FIGURES, elements and parts performing functions corresponding to those in FIGS. 1 through 9 have reference numbers corresponding therewith. The apparatus and process shown in FIGS. 10A—D is similar in many respects to that shown in FIGS. 1A—B, and so only the differences will be described. A controllable speed direct current motor 64 drives the feedscrew 66 through a speed reduction gear drive mechanism 68. For controlling the temperature of the thermoplastic material within the barrel 144 of the extruder 20, there are a plurality of temperature control means 21-1, 21-2, 21-3 and 21-4, shown as electrical resistance heaters positioned along the length of the extruder barrel. A plurality of individual temperature sensors, such as thermocouples (not shown) are associated with the successive regions of the heating zone 18 in which these resistance heaters 21-1 through 21-4 are located. Temperature indicating meters 148-1, 148-2, 148-3 and 148-4 in an extruder control panel 150 provide a read out of the temperature in these successive regions. It is to be understood that the control panel 150 includes control switches for manually turning on or off the electrical power being supplied to the respective resistance heaters 21-1 through 21-4 for regulating their individual heat outputs. Also, if desired, automatic temperature controllers can be included for maintaining the temperature levels desired. Thus, the temperature of the thermoplastic material is accurately controlled as it is fed forward by the feedscrew 66.

Figure 12:
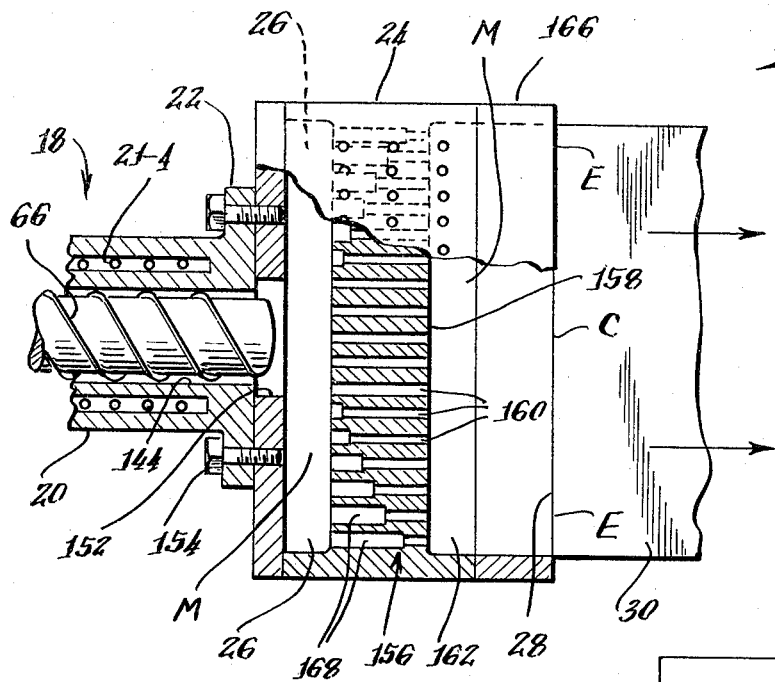
FIG. 12 is a plan sectional view taken along the line 12—12 in FIG. 11.

As shown in FIGS. 10A, 11 and 12, the heated thermoplastic material is forced by the feedscrew 66 under pressure out through the discharge head 22. The mouth 152 of this discharge head feeds into a laterally extending distribution chamber 26 in distributor means 24 which is removably secured by a circle of bolts 154 onto the head 22. This distribution chamber 26 is shown as a cross gallery which extends laterally, as seen in FIG. 12, for a distance approximately equal to the width of the extruded ribbon 30 of heated thermoplastic material. The distributor means 24 is elongated in the lateral direction and serves to feed the heated thermoplastic material to the elongated die orifice 28 (FIG. 12). It is desired to obtain a uniform exiting flow rate of the thermoplastic material issuing at each point across the width of the die orifice 28. That is, the extrusion flow rate at each such point is desired to be approximately the same so that the various regions across the width of this ribbon 30 receive approximately the same flow rate of material. In order to obtain such generally uniform exiting flow rate of the heated thermoplastic material being extruded through this die orifice which is relatively wide and narrow, flow impedance equalization means 156 are provided as will be explained.

As seen in FIG. 12, it is a shorter distance and a more direct route from the mouth 152 of the extruder through the chamber 26 to the center point C of the die orifice as compared to the route from this mouth 152 through the chamber 26 to the edge regions E of this die orifice. Thus, there is a tendency for the extrusion flow rate in the ribbon to be greater near the center point C than at the edge regions E.

The flow impedance equalization means 156 overcomes this tendency for the extrusion flow rate in the ribbon 30 at the center point C to be greater than that in the ribbon 30 at the edge region E. In this embodiment, the flow impedance equalization means 156 comprises a barrier wall 158 extending transversely across the downstream side of the distribution chamber 26. There are two rows of passages 160 leading downstream through this barrier into an outlet channel 162 which extends transversely within the distributor 24 adjacent the downstream side of this barrier wall 158. The downstream side of this channel 162 is defined by the converging space 164 which feeds into the orifice 28. The converging space 164 and the die orifice 28 are located in a transversely elongated die 166 removably attached to the downstream side of the distributor 24.

The flow equalization means 156, as shown in FIG. 12, provides a progressive variation in its flow impeding characteristics as presented across the width of the chamber 26. The flow impeding characteristics of the passages 160 are greater in those located near the center of the chamber 26 and progressively decrease in those located toward both ends of the chamber 26. This progressive variation is accomplished by counterbores 168 enlarging the diamer of the upstream ends of the passages 160. These counterbores extend to progressively greater depths toward the outer ends of the barrier wall 158. As seen in FIG. 12, there is a symmetrical pattern of these passages 160 with the innermost ones not being counterbored.

As an alternative to the use of counterbores 168, the diameters of the outer passages may be progressively increased for decreasing their flow impedance. However, for convenience of construction and for convenience in balancing out the effective uniform flow rates desired in operation, the arrangement as shown in FIG. 12 may be preferred. In the event that any one of the counterbores 168 is found to be too long, it can be effectively shortened by inserting a short cylindrical sleeve. Other means, such as shaped slots, may be used to obtain a flow rate equalization across the width of the product being produced.

In order to maintain the desired temperature in the heated thermoplastic material M (FIGS. 11 and 12) passing through the distributor 24 and entering the converging outlet space 164 (FIG. 12) approaching the orifice, temperature control means 32 are shown associated with the distributor. This temperature control means, as shown, comprises a plurality of electrical resistance cartridge heaters inserted into the sockets in the distributor.

In the production of non-foamed products, a relatively low pressure may exist in the converging die space 164 only enough to prevent starvation of the ribbon 30. In many of the products described in the introduction, a foaming or blowing agent is preferably included in the material M for reducing the product density and weight. The pressures existing in the distributor 24 and in the converging die space 164 are preferably of the order of 1,200 to 3,500 p.s.i. when handling foamed thermoplastic material to prevent any substantial expansion of, or eruption of the blowing agent gas being generated by the foaming agent in the heated material M until after this material has been extruded between the lips of the die orifice for forming the extrudate ribbon 30. Then, as seen in FIG. 11, the foaming agent causes the extrudate to expand in thickness before and while it is being drawn by rolling, squeezing action into the nip region at the upstream end U of the long molding and cooling channel 34 provided between the revolving endless flexible belt molds 36 and 38. In this embodiment as shown in FIGS. 10B and 11, a significant amount of foaming occurs before the thermoplastic ribbon enters into the nip region between the rolling belt molds. Some of the foaming action is captured by the cooled belt mold surfaces thus forming a denser, tougher skin on the product as compared with its foamed interior. Each belt mold includes a three-dimensional flexible pattern form 40 and 40A, respectively, on its front face, as shown in FIG. 17.

As the extrudate ribbon 30 enters into the upstream nip region U, the opposed belt molds are initially pressed, as shown in FIG. 11, against opposite sides of the heated thermoplastic material by a progressive localized rolling, squeezing action. The nip rolls 76 and 80 are revolving with the belt molds 36 and 38 and press them toward each other. Thus, a high pressure per unit area, for example of the order of 100 to 1,000 p.s.i. occurs in this region U to impress both mold forms 40 and 40A into the opposite surfaces of the extrudate ribbon.

After this initial forceful impression is made against these opposite thermoplastic surfaces, they are not allowed to flow away from their impressed shape. The initial three-dimensional impression and surface texture produced by the rolling pressure occurring in region U is retained, because the plastic surfaces are held under pressure in the casting channel 34 between the travelling belt molds. A succession of opposed pairs of back-up rollers 100 (FIGS. 10B and 11) having smooth cylindrical surfaces hold the travelling belt molds 36 and 38 pressing against opposite surfaces of the impressed thermoplastic material.

In operation, it is important for the thermoplastic material in the impressed extrudate ribbon 30' (see also FIG. 17) to completely fill the casting channel 34 so as to produce a continuous product with the desired good pattern and surface texture definition. In other words, do not starve the molding and cooling channel 34. Thus, it is preferred that a slight excess volume of material exist in the extrudate ribbon 30 (FIG. 11) immediately in front of the nip region U. This slight excess volume appears as a moderate bulge in the nature of a standing wave appearing in the ribbon 30 ahead of the nip region. As shown in FIG. 11, the die 166 is spaced slightly away from the upstream end of the casting channel and so this bulge can be observed. We have found that it is a preferred operating procedure to run the extruder 20 (FIG. 10A) at constant speed and then for the operator to make slight vernier adjustments from time to time in the speed of the belt molds 36 and 38 for matching the casting speed with the rate of extrusion of the ribbon 30.

If the excess volume of material in the extrudate ribbon 30 (FIG. 11) becomes too great, it will tend to zig-zag or buckle and fold over thereby causing undue variations in the localized feed rate into the nip region with resultant occasional loss of good pattern definition and wastage of material.

The opposed lips (FIG. 11) of the laterally elongated die orifice 28 are spaced sufficiently far apart for forming an extrudate ribbon 30 with a thickness in front of the nip region U which is slightly greater than the average thickness of the impressed ribbon 30' (FIG. 17).

For cooling this impressed material in casting channel 34 into its memory retention state, the revolving belt molds 36 and 38 are cooled. As shown in FIG. 10B, this cooling of the belt molds may be accomplished by sprays of liquid coolant 171 applied onto their reverse surfaces by coolant applicators 105. These applicators include conduits 170 extending across the width of the belt molds parallel to the back-up rollers 100 each with a row of spray nozzles 172 aimed at the reverse surface of the belt mold in the space between a preceding and succeeding back-up roller.

As shown in FIG. 17, the belt molds 36 and 38 include flexible three-dimensional pattern mold forms 40 and 40A, respectively. These mold forms 40 and 40A are each made of flexible heat resistant material, such as the silicone rubber described in connection with FIG. 4, bonded to a thin wide flexible steel belt support layer 42 and 118 each having a thickness as described above. In this example, the steel support layers 42 and 118 are each approximately 54 inches wide, and the mold forms 40 and 40A are approximately the same width as their steel support layers for casting a product at least 48 inches wide. The upper mold form 40 has projecting shoulders 116 with a three-dimensional shake shingle patterned surface 120 therebetween similar to that described in connection with FIG. 4. The lower mold form 40A (FIG. 17) has mold closing edges 174 which mate with and press against the shoulders 116 for retaining the impressed thermoplastic material 30' in the casting channel 34. Between these mold-closing portions 174, the lower mold 40A has a three-dimensional patterned surface 120A which shapes the back surface of the product being formed. In FIG. 17, the product is a shake shingle architectural panel, and the lower mold surface 120A includes projecting portions 176 for producing product-lightening concavities in the back surface of this panel product.

The arrangement, as shown in FIG. 4, where a bare steel layer 118 is in contact with the back surface of the impressed thermoplastic material being cooled produces a relatively fast cooling of this material. However, the resultant flat back surface on the product increases the amount of material and weight for a product of given size as compared with the use of a lower patterned mold 40A. Moreover, the use of the patterned mold form 40A tends to equalize the rate of heat transfer from both surfaces of the cast product thereby minimizing tendency for warpage of the product during cooling.

In most cases, it is preferred to have approximately the same heat conductivity and approximately the same heat sink capacity in the two belt molds 36 and 38 for equalizing the rate of cooling of opposite sides of the product. Thus, the average thickness of the upper and lower mold forms 40 and 40A is preferred to be approximately the same. Some cooling of the thermoplastic material is obtained by the heat sink capacity of the belt molds 36 and 38 which give off some heat to their surroundings during each cycle of revolution.

In order to increase the heat conductivity of the mold forms 40 and 40A, many fine particles 178 (FIG. 17) of metal of good heat conductivity, such as copper or aluminum, may be uniformly dispersed within the silicone rubber material from which they are molded.

As an alternative to, or as a supplement to, applying liquid coolant directly to the steel layer, reverse surfaces 42 and 118 (FIG. 17) of the revolving belt molds 36 and 38, coolant may be applied directly to their front faces 120 and 120A as shown in FIGS. 10B and 11. This coolant 180 is applied during the return travel flight of each belt mold 36 and 38. These return flights extend from the respective downstream rolls 78 and 82 (FIG. 10B) to the nip rolls 76 and 80 (FIGS. 10B and 11). For obtaining a good impression with fine definition, it is preferred that the molding surfaces 120 and 120A be dry as they impress the extrudate ribbon 30. Accordingly, the coolant 180 (FIG. 11) being sprayed onto the molding surfaces 120 and 120B leaves these surfaces in a dry condition. This effectively dry coolant 180 may comprise a readily evaporatable cold mist of very fine liquid particles such as a Freon refrigerant. This effectively dry coolant 180 may be blasts of cold air blown under pressure through ducts 182 extending across the width of the mold belts 36 and 38 and issuing from rows of nozzles 184 positioned at spaced points along each duct 182.

A pair of sheet metal housings 186 (FIGS. 10B and 11) shroud the return flights of the belt molds and enclose the coolant application ducts 182 for isolating the belt molds from ambient air while the coolant blasts 180 are being applied. The side walls and end walls of this shroud 186 are positioned near to the moving mold surfaces 120 and 120A for excluding ambient air. As shown in FIG. 11, a covering 188 of thermal insulation may be installed on each shroud 186 for increased thermal efficiency. An exhaust outlet 190 (FIG. 10B) communicates with the interior of each shroud.

As an alternative to either or both of the liquid coolant sprays 171 and the effectively dry coolant sprays 180, or as a supplement to either or both of these sprays, the nip rolls 76 and 80 and/or the downstream rolls 78 and 82 may be chilled by internally applied sub-zero coolant for cooling the belt molds 36 and 38. In this embodiment, the nip rolls 76 and 80 are shown as being chilled by sprays 192 (FIGS. 11 and 13) of a Freon refrigerant at sub-zero temperature. A refrigeration system 194 (FIG. 13) feeds the cold refrigerant liquid through a supply line 196 into a stationary coupling 198 which is secured in sealed relationship to a pipe line 200. This pipe line extends along the axis through the hollow nip roll and has a plurality of nozzles 202 for directing the sub-zero sprays 192 against the roll's interior surface. The upper nip roll 76 is shown in FIG. 13, and a similar arrangement is provided for the lower nip roll 80 as indicated in FIG. 11.

As the refrigerant 192 absorbs heat from the metal roll 76, it evaporates and the gaseous refrigerant 203 flows through the annular space 204 within the hub 206. This gas flow enters a rotating gland 208, which is attached to the hub and flows out through its ports into an encircling stationary gland 210 connected through a return line 212 to the refrigeration system. Seals 214 are provided to prevent leakage.

The roll 76 is mounted by bearings 216 (FIG. 13) in an upper carriage frame 218 and is driven through its other hub 219 by a drive shaft 220 containing universal joints 222. The lower nip roll 80 is similarly mounted in a lower frame 224 and is similarly driven by drive shaft 226 (FIG. 10B). For assuring that the two belt molds 36 and 38 continue to revolve in synchronism for maintaining registry between their mold patterns, a differential transmission 86 may be provided similar to that described for FIG. 1A. In FIG. 10B, this differential 86 is located in the drive shaft 226 between the lower nip roll 80 and the main drive mechanism 84 for both rolls.

The upper carriage frame 218 (FIG. 10B) can be raised by hydraulic lift cylinders 228 for separating the upper belt mold 36 from the lower one 38, so that the molding and cooling channel 34 opens up and the belt molds can be removed and replaced for changing mold patterns and for servicing. In order to clamp the upper carriage frame 218 to the lower frame 224 for exerting pressure of the belt molds against opposite surfaces of the extrudate ribbon 30, there are upstream and downstream hydraulic clamp cylinders 230 and 232, respectively, (FIG. 10B) clevis mounted on the upper frame. Each cylinder has a piston rod 234 with a hook 236 releasably engaging a bracket 238 on the lower carriage. There is a similar pair of clamp cylinders (not shown) on the opposite side of the apparatus from that shown in FIG. 10B. A pressure relieve valve is associated with the hydraulic circuit for each clamp cylinder 230 and 232 for allowing the belt molds to separate for opening the casting channel 34 in case the pressure becomes excessive due to overfeed of the extrudate ribbon 30.

The three-dimensionally impressed thermoplastic material 30a (FIG. 10B) has been cooled down into its memory retention state and is discharged from the downstream end D of the molding cooling apparatus 240. It is carried by conveyor means 239, shown as a plurality of freely rotatable rollers, into cooling apparatus 241 which serves the purpose of further cooling the material 30a under controlled conditions while containing it and holding it flat. The cooling apparatus 241 has a pair of revolving cooling belts 242 and 244 each including a wide thin steel support layer 246 having a relatively thick, soft, readily-compressible rubber blanket 248 bonded thereto. The revolving blankets 248 are cooled and they yield in the manner of muffs into conformance with the three-dimensional profiled and textured surfaces of the product material 30a. Thus these yieldable blankets 248 controllably cool the product material while holding the whole width and the length thereof flat to prevent warpage during cooling.

The cooling apparatus 241 is generally similar to the molding cooling apparatus 240 previously described, except that a relatively light pressure is exerted upon the product material in the containment-muff-cooling channel 250 sufficient to hold it flat while the attractive textured surface definition and profiles of the product material are preserved during its further cooling. The cooling of the revolving cooling belts 242 and 244 may be accomplished in any one or more of the three ways already described, plus a fourth way: (1) by liquid coolant sprays 171 (FIG. 10C) applied to the steel belt layers on the reverse surface of each belt, (2) by chilling the upstream rolls 76 and 80 and/or the downstream rolls 78 and 82, (3) by coolant sprays 180A applied to the front surfaces of the muff blanket 248, or (4) by heat sink capacity of the revolving belts which give up heat to the ambient during each full cycle of revolution. This coolant 180A may be liquid, if desired, for example such as cold water mist or spray, because the contoured and textured surfaces of the product material 30a have already been cooled into their memory retention state such that they are not adversely affected by the damp or wet muff blankets 242 and 244. In view of the low thermal conductivity of the yieldable blankets 242 and 244, the direct cooling of their surfaces by applying coolant 180A is the most rapid of these three ways for cooling the product.

A drive mechanism 84-1 serves to drive both of the cooling belts 242 and 244 at substantially the same speed through drive connections 220 and 226.

Figure 10C:
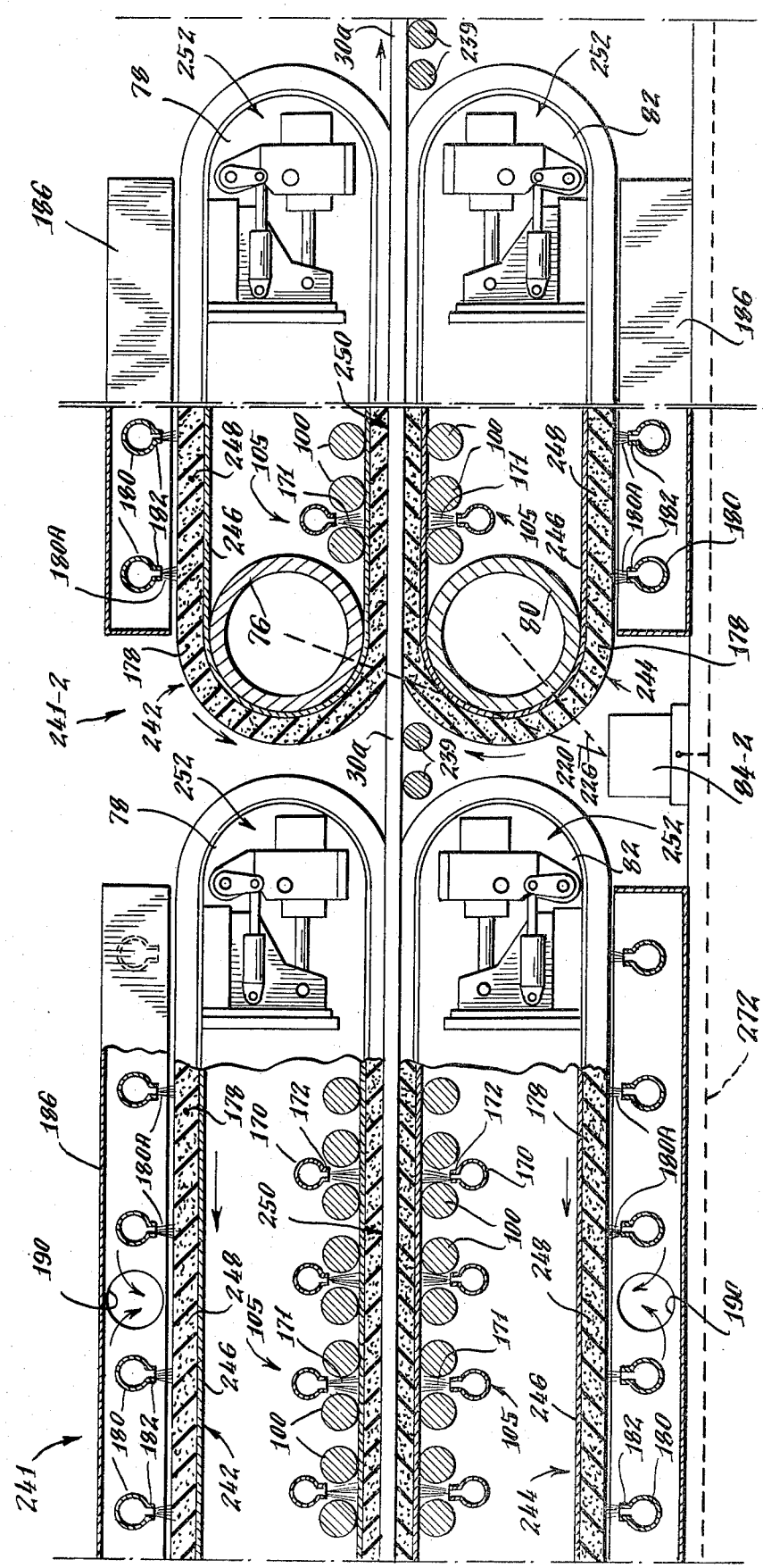
Figure 11:
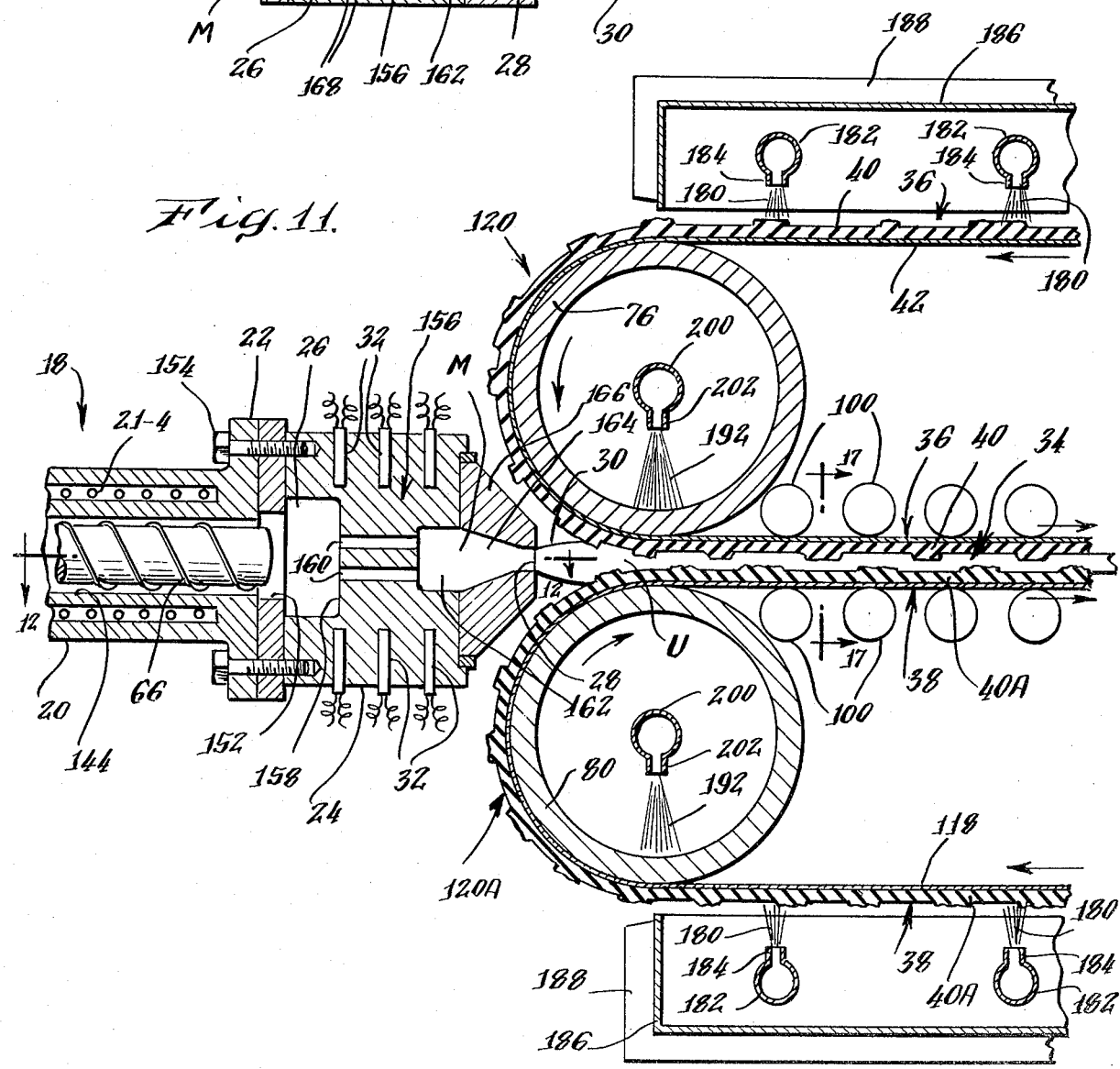
FIG. 11 is a longitudinal elevational sectional view of a portion of FIG. 10B, on enlarged scale illustrating the extrusion and impression and casting steps more clearly.

As shown in FIG. 10C, the product material 30a may be further cooled if desired by additional cooling apparatus 241-2, which is identical to the cooling apparatus 241. Drive mechanism 84-2 revolves the two cooling belts 242 and 244 of the apparatus 241-2 at substantially the same speed. This additional cooling apparatus 241-2 serves to increase the overall cooling capacity of the line for increasing production rate and may be omitted.

For increasing the thermal conductivity of the yieldable blankets 248, fine particles 178 of metal of good heat conductivity, such as copper or aluminum, may be dispersed throughout each blanket.

In order to tension and steer the revolving wide belt molds 36 and 38 in the molding and cooling apparatus 240 (FIG. 10B), there is shown tensioning and steering apparatus 252 associated with each of the downstream rolls 78 and 82. This apparatus 252 is similar to that shown in U.S. Pat. No. 3,878,883, mentioned above. The cooling apparatus 241 and 241-2 includes similar apparatus 252 for tensioning and steering the cooling belts 242 and 244.

As shown in FIG. 10D, the cooled, molded product material 30a may be carried by a driven conveyor 261 past edge trimming means 260 and into a treatment station 262 to apply a surface treatment such as by painting 263 and drying 264. A cut-off station 50 cuts the products P to length, and a finishing conveyor 52 leads the products through a finishing treatment station 54, for example such as described in connection with FIG. 1B. The products P are carried away from the production line by a conveyor 266.

In order to control the speed of the various drive mechanisms 84, 84-1, 84-2, 84-3, 84-4 and 84-5 (FIGS. 10B, C, D), an electrical drive control panel 270 is connected by electric lines 272 to these respective drive mechanisms.

Figure 15:
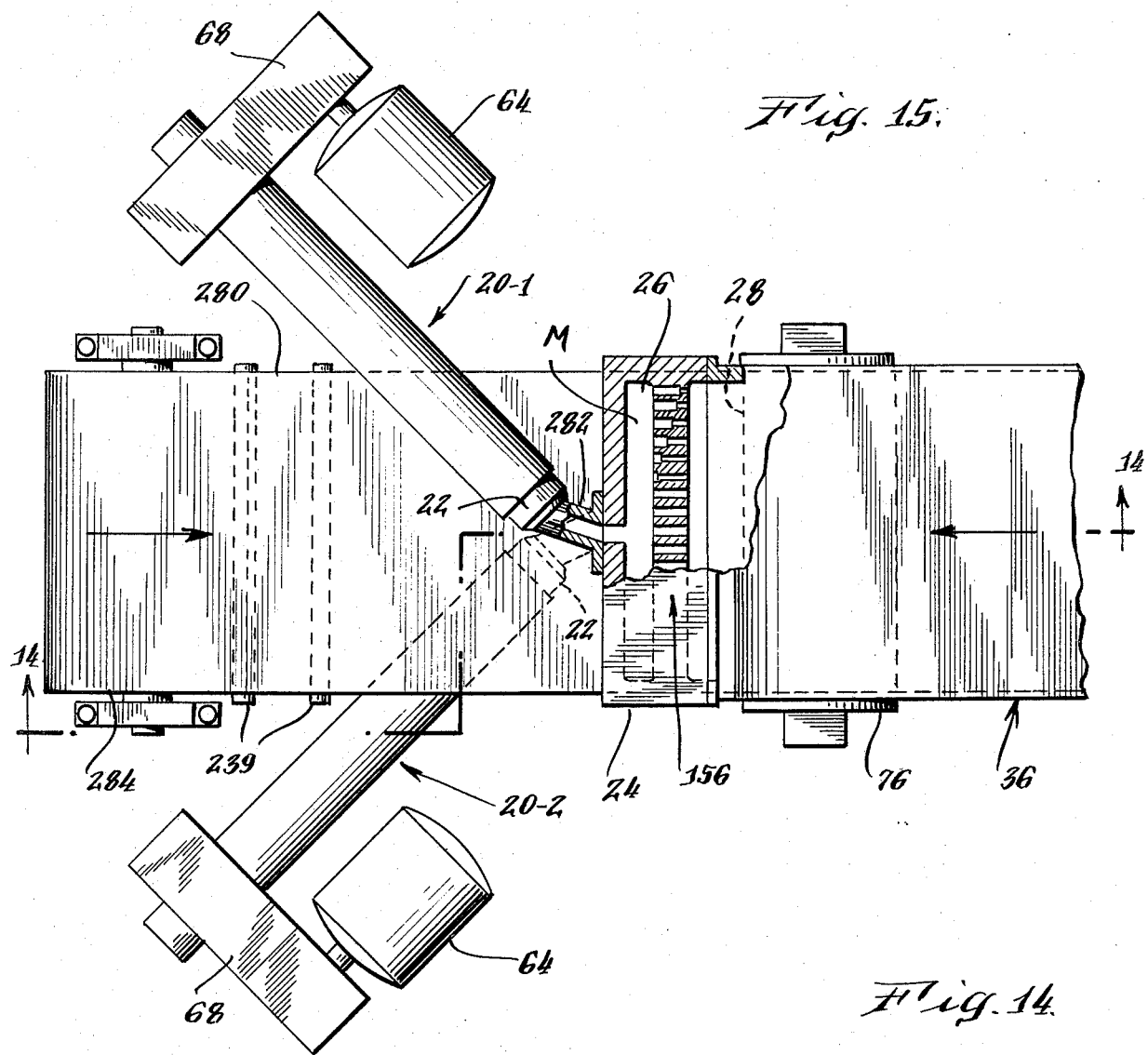
FIG. 15 is a plan view of the apparatus of FIG. 14, with portions shown in section.
Figure 14:
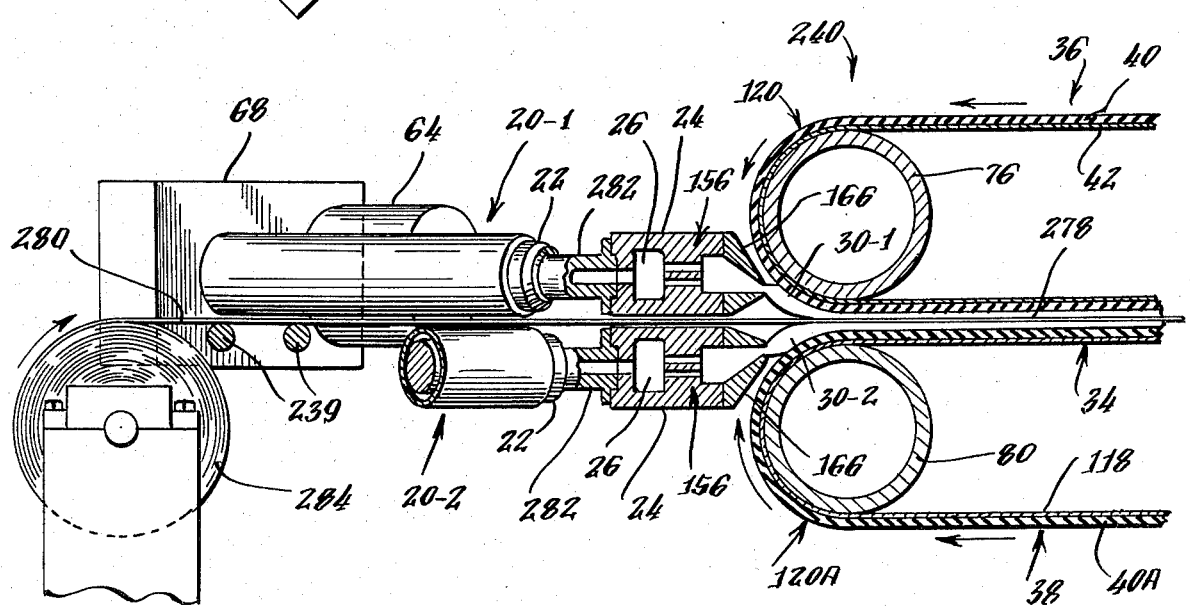
FIG. 14 is a longitudinal elevational view, with portions shown in section taken along the lines 14—14 in FIG. 15, of further modified apparatus embodying this invention and for performing the process of the invention showing a continuous ply of reinforcing material being embedded into the product being continuously cast.

FIGS. 14 and 15 show a continuous ply 278 of reinforcing material 280 being embedded between the extrudate ribbons 30-1 and 30-2 which are simultaneously extruded by a pair of extruders 20-1 and 20-2. Each extruder has a drive motor 64 with a speed reduction drive mechanism 68 for turning the extruder feedscrew (not shown) and has its discharge head 22 aimed at an angle of approximately 45° toward the centerline of the respective distributor 24. Each of these distributors 24 is similar to that shown in FIGS. 11 and 12, except that dies 166 are aimed, as shown in FIG. 14, slightly toward the intervening web of reinforcing material 280. A transition passage 282 couples each discharge head 22 to the lateral chamber 26 in its distributor 24.

The reinforcing material 280 is fed from a supply roll 284 and is guided by freely rotating rollers 239 into the clearance space between the upper and lower extruders 20-1 and 20-2. This reinforcement 280 may, for example be a web of expanded metal or of asbestos, a fabric of glass fibers or of synthetic plastic fibers, woven wire cloth, a braid of metal, glass or plastic strands, a perforated sheet of metal or of plastic, or a web of multiple individual filaments or cords of high tensile strength.

As the extrudate ribbons 30-1 and 30-2 (FIG. 14) are pressed toward each other by the rolling squeezing action between the belt molds 36 and 38 pressed by the nip rolls 76 and 80, the heated thermoplastic material is driven into the interstices of the reinforcement ply 278. Thus, a strong large area product with attractively contoured and textured surfaces is produced.

The molding cooling apparatus 240 (FIGS. 14 and 15) is similar to that shown in FIGS. 10B and 11) and may be cooled in any one or more of the three ways described above. The mold patterns 120, 120A may be any of the various patterns for producing the products set forth in the introduction or for producing other reinforced products having three-dimensional patterns and attractive surface textures.

FIG. 16 shows cooling apparatus 286 which may be used in lieu of the cooling apparatus 241 and 241-2 shown in FIG. 10C. Pairs of opposed large diameter rolls 288 each has a relatively thick, soft, readily-compressible rubber covering 290 bonded thereto. These compressible coverings 290 yield into conformance with the surfaces of the product material, while the opposed rolls 288 hold the product material against warpage as it is being cooled. Coolant fluid 48, for example water sprays, is directed against both surfaces of the product material by coolant conduits 292 with spray nozzles 294. A pair of housings 296 enclose the cooling apparatus 286 and include exhaust outlets 190, with a drain 298 in the lower housing.

FIG. 18 shows a large area of impressed thermoplastic material 30a which has been cooled into its memory retention state being discharged from the molding and cooling apparatus 240. The flexible mold form 40 has a three-dimensional patterned and textured surface 120 for molding a product having the appearance of a wall built from laid-up courses of masonry units 300 with intervening recessed mortar joints 302. These masonry units 300 are generally rectangular, for example such as bricks, cut stone, or cast concrete blocks. In addition to having ridges 304 for molding the recessed mortar joints 302, the three-dimensional mold pattern 120 has a rough and irregular surface texture 306 of good definition for molding a realistic rough surface on the masonry units 300. This realistic molded surface on the various masonry units 300 includes apparent cracks, spalling, pitting, chipped edges or chipped corners, such as actually occur in such a laid-up wall. This mold surface 120 is conveniently obtained by molding the form 40 of room temperature vulcanizing silicone rubber horizontally over the face of a masonry surface which is desired to be reproduced.

Figure 21:
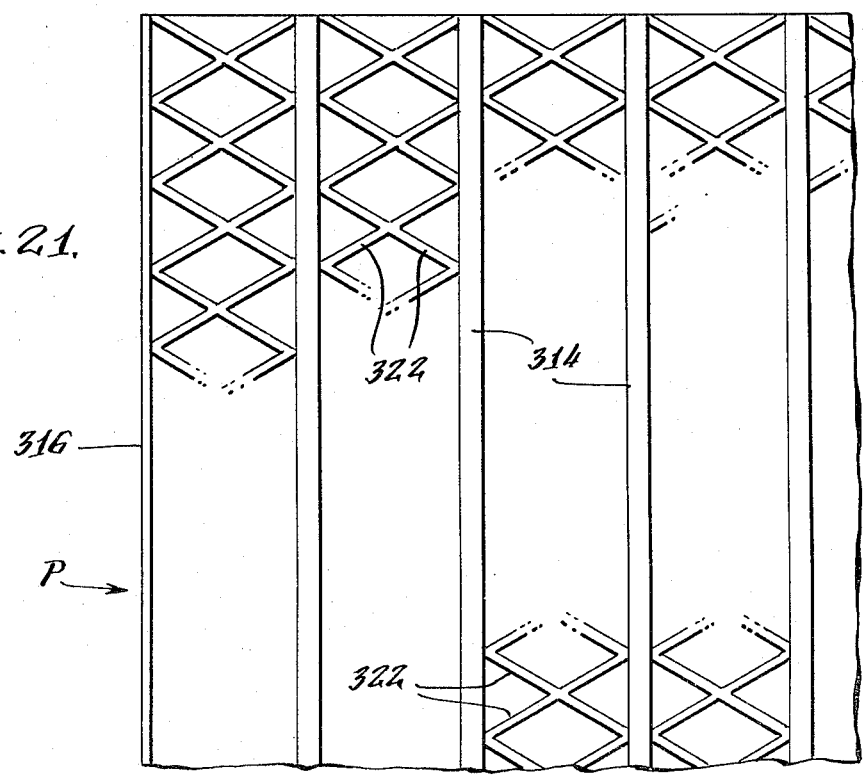
FIG. 21 is a plan view of the rear surface of a panel product similar to that of FIG. 19 showing a diamond ribbing which may be formed with or without the longitudinal ribbing.

The lower mold surface 120A may be smooth or may contain a grid of recesses (as shown) in a square or diamond pattern for molding a square or diamond rib pattern on the back surface of the product or a waffle pattern may be molded, and so forth. If desired, parallel ribs, such as shown in FIG. 21, may be molded on the back surface of the panel product shown in FIG. 18.

Figure 19:
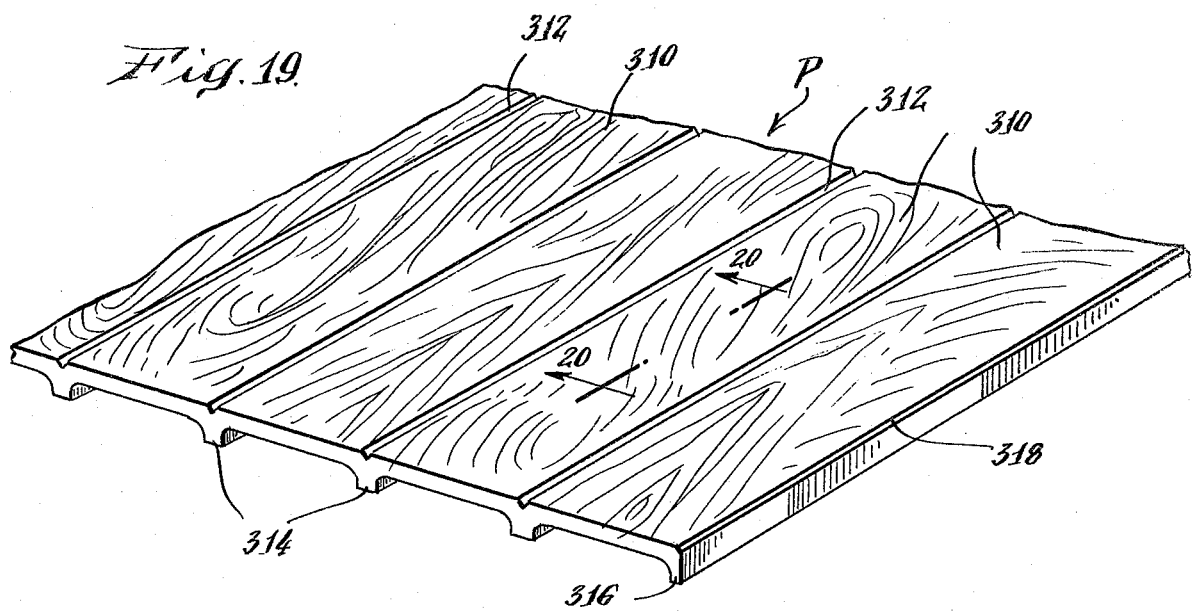
FIG. 19 is a perspective view of a portion of a woodgrain-surface textured soffit, wall or decorative plank panel having a longitudinally ribbed back surface which can be produced by practicing the invention.

In FIG. 19 is shown a portion of a wood-grain textured panel product P for use in building soffits, walls, partitions and the like. This panel is molded of thermoplastic material by the process and apparatus of the invention and is three, four or six feet wide, and is six, eight, or ten feet long, or longer, only a small portion being shown in FIG. 19. The apparent individual plank strip 310 each has an individualized wood grain surface texture as indicated. There are longitudinal Vee grooves 312 molded between planks for setting off each plank. In installation, the nails are driven at the location of these grooves and are countersunk to provide a neat appearance. Centered directly behind each Vee groove 312 is a reinforcing rib 314 for stiffening the panel P and for spacing it away from the sub-structure to which it is nailed.

Also, these longitudinal ribs 314 serve to provide the panel with an overall effective thickness comparable to wood panels. Thus, existing standardized architectural dimensions and fittings for wood panels can be employed for this product. The rib 316 along each edge (only one edge is seen) has one-half of the thickness of an interior rib 314, and the edge is chamfered at 318 corresponding to one-half of a Vee groove. This edge treatment 316, 318 allows for adjacent panels to be abutted together when installed in proper mating relationship to form a complete rib and complete Vee groove along the joint.

Figure 20:
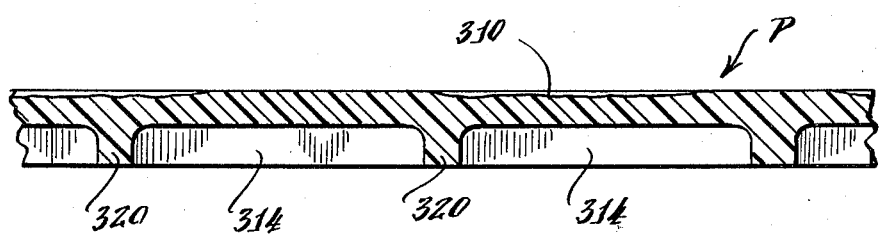
FIG. 20 is a section on the line 20—20 in FIG. 19 showing cross ribbing which also may be formed on the back surface of the product of FIG. 19.

As shown in enlarged section in FIG. 20, the rear surface of the panel product P may also include cross ribs 320, which are optional, thus producing a rectangular or square grid pattern of the longitudinal ribs 314 and cross ribs 320, depending upon their relative spacing.

As shown in FIG. 21, the rear surface of any of the panel products described may include longitudinal ribs 314, half-width edge ribs 316, with intermediate ribs 322 laid out in a diamond configuration. Various other grid configurations of stiffening ribs may be used.

For example, underlayment panels for use on a concrete slab floor can be advantageously produced from thermoplastic material by the present invention. Such underlayment panels provide resiliency and moisture barrier beneath a floor covering. They are produced similar to the panel P in FIG. 19 with the grooves 312 omitted from the upper surface and with the longitudinal and cross ribs 314 and 320 uniformly spaced in a square grid adapted to rest down upon a concrete floor. The trapped air in the spaces between the ribs 314 and 320 provides thermal insulation in addition to the insulation value provided by the underlayment itself.

In FIG. 22, a rigid funnel extension 324 of metal is attached by machine screws 326 to the downstream face of the die 166 with the funnel passage aligned with the elongated die orifice 28. This funnel extension diverges or flares out in a downstream direction toward the adjacent revolving mold surfaces 120 and 120A. An electrical heater 328 with temperature control is installed on the funnel extension. This extension may be used to advantage when extruding a low density foamed extrudate ribbon 30 containing a relatively great amount of blowing agent for producing a low density product. For example, as shown here, the upper mold surface 120 produces a three-dimensional masonry wall profile with an apparent stone textured surface and the lower mold surface 120A has recesses 330 for producing an egg-crate rib pattern on the reverse surface of the product.

As shown in FIGS. 23 and 24, either edge or both edges of the products can be shaped into desired configurations by one or two revolving flexible edge belt molds 340 and 342. These edge belt molds travel at the same speed and cooperate with the main belt molds 36 and 38. The edge belt molds 340 and 342 are each supported on a deck 344 which is mounted on the lower side frame 224 (FIG. 10B), and they revolve around upstream and downstream end rollers 346 and 348 being guided by a plurality of intermediate guide rollers 350. These edge belt molds may be driven in synchronism with the main belt molds 36 and 38 by utilizing driving and synchronizing apparatus, such as described above. Alternatively, they may be supported for free revolving motion so that they are driven by frictional contact with the main belt molds. For example, FIG. 24 shows that frictional contact may be provided by extending the edges of the metal layers 42 and 118 of the main belt molds 36 and 38 a few inches beyond the edges of the mold forms 40 and 40A. Then, the edge belt molds 340 and 342 are sandwiched between these extended edge portions 42-1, 42-2, 118-1, 118-2 of the metal support layers 42 and 118, respectively.

The edge belt molds 340 and 342 include flexible pattern forms 352 and 354, respectively, supported upon and bonded to a thin metal belt layer 356 and 358, respectively. For providing the desired frictional contact, the pattern forms 352 and 354 project slightly beyond the edges of their metal support layers 356 and 358. The overall size of the edge pattern forms 352 and 354 is such that they sandwich snugly between the respective pairs of projecting belt layers 42-1 and 118-1, and 42-2 and 118-2.

FIG. 24 shows a mold configuration for simultaneously forming a pair of building panels each having ribbed grids on opposite surfaces of the panel. Accordingly, the three-dimensional patterned surfaces 120 and 120A include longitudinally extending channels 360 and transversely extending channels 361 for forming the desired grid pattern. These forms also define a stiffening frame 362 extending around the perimeter of each building panel. The longitudinal edges of the perimeter frame 362 include a tongue 364 and a groove 366 as defined by the molds.

In order to maintain the related mold patterns 120 and 120A directly opposed to each other, i.e. in registration, there are means provided for synchronizing the movement of the revolving belt molds 36 and 38. Thus, the transverse rib channels 361 are always aligned in registration on opposed faces of the panel. The belt molds 36 and 38, as shown in FIG. 24, are designed for simultaneously forming two of these building panels side-by-side, thereby doubling the production rate. The central portions of the forms 40 and 40A have shoulders 116 which abut against each other for separating the two side-by-side mold cavities. These abutting shoulders 116 define the tongue regions 364 projecting from the edge frames 362 of the respective panels.

The groove regions 366 of these panels are defined by a projecting ridge extending longitudinally along the belt molds 352 and 354. These building panels which are being made with a grid or ribs on both faces may be used as room dividers within building partitions, stiffeners, sound deadners, moisture barriers and insulation panels.

For carrying out the mode of cooling illustrated in FIG. 13, it is desirable that the arc of rolling contact between the revolving belt molds 36 and 38 and each of the respective upstream and downstream main rolls 76, 78, 80 and 82 extend over a circumferential distance of at least two feet.

We claim:

1. A continuous impression molding process for making three-dimensional patterns on thermoplastic polymeric material comprising the steps of:
   continuously providing a heated ribbon of substantially uniform thickness of said material in a plastic state at a temperature above its glass transiton temperature,
   initially pressing opposed endless flexible belt molds, at least one of which has a three-dimensional rubber pattern form with abrupt changes in profile extending longitudinally of the belt and in surface contour extending transversely of the belt, against opposite sides of said heated ribbon while its temperature is above its glass transition temperature, so as to displace at least a portion of said ribbon in a continuous progressive localized pinching nip action with sufficient initial pressure for impressing a three-dimensional pattern on the heated material of said ribbon,
   moving said opposed flexible belt molds and carrying said impressed material along between said opposed molds while exerting sufficient pressure against opposite sides of the material to retain said three-dimensional pattern therein,
   cooling said moving opposed molds for cooling said impressed material down to a temperature in its memory retention state to cause said cooled material to retain said three-dimensional pattern, and
   removing the cooled impressed material from between the opposed molds.

2. The continuous process, as claimed in claim 1, in which said three-dimensional pattern contains abrupt changes in profile extending longitudinally plus contour variations extending transversely with respect to the direction of movement of said ribbon, including the steps of:
   preliminarily forming longitudinally extending changes in profile in said ribbon generally corresponding in shape to those in said pattern by feeding through an orifice for reducing the displacement of the heated material occurring during said initial pressing, and
   forming said transversely extending variations in said heated material during said initial pressing between said opposed molds.

3. The continuous process, as claimed in claim 1, in which:
   said endless flexible belt molds are initially pressed against opposite sides of said heated ribbon by a localized rolling squeezing action exerting a pressure in the range from 100 p.s.i. to 1,000 p.s.i.

4. The continuous process, as claimed in claim 1, in which:
   said moving flexible belt molds are being cooled as they are being initially pressed against opposite sides of said heated ribbon.

5. The continuous process, as claimed in claim 1, including the further steps of:

holding the cooled impressed material for restraining warpage thereof while continuing to move the impressed material after removal from between the opposed molds, and further cooling said impressed material while so holding and moving it.

6. The continuous process, as claimed in claim 1, in which:

related three-dimensional patterns are shaped on opposite sides of said thermoplastic polymeric material, and synchronizing the movement of said belts for maintaining said related patterns in registration on opposite sides of the impressed material.

7. The continuous process, as claimed in claim 1, in which:

said continuous providing of said heated ribbon is carried out by extruding the heated material through an orifice to form the moving ribbon of said material.

8. The continuous process as claimed in claim 1, including the further steps of:

pressing at least one endless flexible edge belt mold against one edge of said heated ribbon for shaping the contour of said edge, and moving said edge belt mold along with said opposed belt molds while exerting sufficient pressure for retaining the shaped contour of said edge during cooling of the impressed thermoplastic material.

9. The continuous process, as claimed in claim 1, including the step of:

feeding and converging simultaneous flow of heated thermoplastic polymeric material in a plastic state for providing said ribbon.

10. The continuous process, as claimed in claim 9, in which:

said simultaneous flows form regions of differing characteristics in the cooled impressed thermoplastic material.

11. The continuous process, as claimed in claim 1, including the step of:

introducing a web of reinforcing material into the ribbon for embedding said web in the impressed cooled material.

12. The continuous process, as claimed in claim 11, in which:

a first and a second ribbon of the heated thermoplastic material are fed on opposite sides of a moving reinforcing web, and said first and second ribbons are squeezed together with said web becoming sandwiched therebetween during said initial pressing.

13. The continuous process, as claimed in claim 12, in which:

said first and second ribbons are formed by passing heated thermoplastic material through first and second die orifices positioned near opposite sides of said moving web.

14. A continuous thermoplastic product made by the process of claim 12 having abrupt changes in profile extending longitudinally of the product and in surface contour extending transversely of the product and having a continuous reinforcing web embedded within the thermoplastic material of the product.

15. A continuous thermoplastic product made by the process of claim 1 having a three-dimensional pattern including abrupt changes in profile extending longitudinally of the product and in contour extending transversely of the product.

16. A continuous impression molding process for making three-dimensional patterned products from thermoplastic polymeric material comprising the steps of:

continuously providing a moving heated ribbon of said material in a plastic state at a temperature in the range between its glass transition temperature and 220° F. thereabove, providing opposable endless flexible belt molds at least one of which has a three-dimensional rubber pattern form and capable of defining a mold cavity, when positioned in opposed relationship, initially pressing said molds in opposed relationship in a continuous progressive localized rolling squeezing pinching nip action against said moving heated ribbon for forming the cavity while impressing a three-dimensional pattern on the heated material of said ribbon, said three-dimensional pattern defining areas in said thermoplastic material varying in the range of 1/8 inch to one-inch thick, moving said molds along a predetermined path while holding the molds in opposed relationship for retaining the impressed material within the travelling mold cavity formed by the opposed moving molds, cooling the opposed moving molds for cooling the impressed material down to a temperature level below said glass transition temperature into its memory retention state to cause the cooled material to retain said impressed three-dimensional pattern, and removing and treating the cooled impressed material for making the three-dimensional patterned products.

17. The continuous process, as claimed in claim 16, including the step of:

passing a sheet of flexible material into said travelling mold cavity together with said heated thermoplastic ribbon for forming a decorative or protective surface layer on the products produced.

18. The continuous process, as claimed in claim 17, including the step of:

impressing the three-dimensional pattern through said sheet onto said heated material.

19. The continuous process, as claimed in claim 16, in which:

at least one of said molds has a smooth surface adjacent said mold cavity.

20. Process of claim 16 in which the rubber molds have a durometer hardness reading in the range of 25 to 100.

21. Process of claim 16 in which the three-dimensional pattern includes both surface texture impressions and relief impressions.

22. A continuous process, as claimed in claim 16, in which:

a slight excess of the heated thermoplastic polymeric material exists in the heated ribbon immediately before the initial pressing of said flexible belt molds against opposite sides of said heated ribbon occurs, and said excess appears as a bulge in the nature of a standing wave preceding said initial pressing.

23. A continuous process, as claimed in claim 23, in which:

the removing and treating step includes cutting the material into product lengths.

24. A continuous process, as claimed in claim 23, in which:

a blowing agent is included in the heated thermoplastic polymeric material in said heated ribbon, and said blowing agent is allowed to bulge the heated ribbon before initially pressing said flexible belt molds against opposite sides thereof.

* * * * *